United States Patent
Nishida et al.

(10) Patent No.: US 12,462,343 B2
(45) Date of Patent: Nov. 4, 2025

(54) MEDICAL DIAGNOSTIC APPARATUS AND METHOD FOR EVALUATION OF PATHOLOGICAL CONDITIONS USING 3D OPTICAL COHERENCE TOMOGRAPHY DATA AND IMAGES

(71) Applicants: Osaka University, Osaka (JP); Topcon Corporation, Tokyo (JP)

(72) Inventors: Kohji Nishida, Suita (JP); Kazuichi Maruyama, Suita (JP); Atsuya Miki, Suita (JP); Ryo Kawasaki, Suita (JP); Hirokazu Sakaguchi, Suita (JP); Chikako Hara, Suita (JP); Song Mei, Warren, NJ (US); Yasufumi Fukuma, Wako (JP); Zaixing Mao, Tokyo (JP); Zhenguo Wang, Ridgewood, NJ (US); Kinpui Chan, Ridgewood, NJ (US)

(73) Assignees: OSAKA UNIVERSITY, Osaka (JP); TOPCON CORPORATION, Tokyo (JP)

( * ) Notice: Subject to any disclaimer, the term of this patent is extended or adjusted under 35 U.S.C. 154(b) by 324 days.

(21) Appl. No.: 18/012,667

(22) PCT Filed: Jun. 22, 2021

(86) PCT No.: PCT/JP2021/023628
§ 371 (c)(1),
(2) Date: Dec. 23, 2022

(87) PCT Pub. No.: WO2022/004492
PCT Pub. Date: Jan. 6, 2022

(65) Prior Publication Data
US 2023/0306568 A1    Sep. 28, 2023

Related U.S. Application Data

(60) Provisional application No. 63/045,508, filed on Jun. 29, 2020.

(51) Int. Cl.
*G06T 7/11*    (2017.01)
*A61B 3/10*    (2006.01)
(Continued)

(52) U.S. Cl.
CPC ............... *G06T 5/50* (2013.01); *A61B 3/102* (2013.01); *A61B 3/1225* (2013.01);
(Continued)

(58) Field of Classification Search
CPC ....... A61B 3/102; G06T 7/11; G06T 2200/04; G06T 2207/10101; G06T 2207/30041; G06T 7/0012; G16H 30/40; G16H 50/20
See application file for complete search history.

(56) References Cited

U.S. PATENT DOCUMENTS

2011/0299034 A1*  12/2011  Walsh ................... A61B 3/132
                                                      351/206
2016/0135683 A1   5/2016   Yasuno et al.
(Continued)

FOREIGN PATENT DOCUMENTS

CN    105787924 A    7/2016
CN    108416793 A    8/2018
(Continued)

OTHER PUBLICATIONS

Agrawal R, Li LKH, Nakhate V, Khandelwal N, Mahendradas P. Choroidal Vascularity Index in Vogt-Koyanagi-Harada Disease: An EDI-OCT Derived Tool for Monitoring Disease Progression. Transl Vis Sci Techn. 2016;5(4). (Year: 2016).*
(Continued)

*Primary Examiner* — Emily C Terrell
*Assistant Examiner* — Jacqueline R Zak
(74) *Attorney, Agent, or Firm* — XSENSUS LLP

(57) ABSTRACT

A medical diagnostic apparatus includes a receiver circuit that receives three-dimensional volumetric data of a sub-
(Continued)

ject's eye, and a processor configured to separate portions of the three-dimensional volumetric data into separate segments, perform processing differently on each of the separate segments, and combine the separately processed segments to produce an enhanced three-dimensional volumetric data set. The processor is further configured to generate at least one diagnostic metric from the enhanced three-dimensional volumetric data set, and the processor is further configured to evaluate a pathological condition based on the at least one diagnostic metric. Related methods and computer readable media are also disclosed.

8 Claims, 28 Drawing Sheets

(51) Int. Cl.
*A61B 3/12* (2006.01)
*G06T 5/50* (2006.01)
*G06T 7/00* (2017.01)
*G06T 7/30* (2017.01)
*G06T 7/60* (2017.01)

(52) U.S. Cl.
CPC .............. *G06T 7/0014* (2013.01); *G06T 7/11* (2017.01); *G06T 7/30* (2017.01); *G06T 7/60* (2013.01); *G06T 2200/04* (2013.01); *G06T 2207/10101* (2013.01); *G06T 2207/20036* (2013.01); *G06T 2207/20212* (2013.01); *G06T 2207/30041* (2013.01); *G06T 2207/30096* (2013.01); *G06T 2207/30101* (2013.01); *G06T 2207/30242* (2013.01)

(56) References Cited

U.S. PATENT DOCUMENTS

| | | | |
|---|---|---|---|
| 2016/0284103 | A1* | 9/2016 | Huang .................... A61B 3/102 |
| 2018/0360308 | A1 | 12/2018 | Aimi et al. |
| 2019/0274538 | A1 | 9/2019 | Imamura et al. |
| 2019/0343383 | A1 | 11/2019 | Spaide |
| 2020/0279352 | A1 | 9/2020 | Mao et al. |
| 2020/0281464 | A1 | 9/2020 | Tokuda et al. |
| 2021/0022600 | A1 | 1/2021 | Tanabe et al. |
| 2021/0082163 | A1 | 3/2021 | Mei et al. |
| 2021/0104313 | A1 | 4/2021 | Mizobe et al. |
| 2021/0224957 | A1 | 7/2021 | Iwase et al. |
| 2021/0224997 | A1 | 7/2021 | Kushida et al. |
| 2021/0319551 | A1 | 10/2021 | Mei et al. |
| 2021/0390696 | A1 | 12/2021 | Iwase et al. |
| 2021/0398259 | A1 | 12/2021 | Yamazoe et al. |

FOREIGN PATENT DOCUMENTS

| | | |
|---|---|---|
| CN | 109730633 A | 5/2019 |
| JP | 2015-131 A | 1/2015 |
| JP | 2017-104309 A | 6/2017 |
| JP | 2019-154718 A | 9/2019 |
| JP | 2019-180693 A | 10/2019 |
| WO | 2019/102739 A1 | 5/2019 |
| WO | 2019/203311 A1 | 10/2019 |
| WO | WO-2020036182 A1 * | 2/2020 .......... A61B 3/0025 |
| WO | 2020/075719 A1 | 4/2020 |
| WO | 2020/183791 A1 | 9/2020 |

OTHER PUBLICATIONS

Albrecht, P., Blasberg, C., Ringelstein, M. et al. Optical coherence tomography for the diagnosis and monitoring of idiopathic intracranial hypertension. J Neurol 264, 1370â1380 (2017). (Year: 2017).*
Ambiya, V., Goud, A., Rasheed, M. A., Gangakhedkar, S., Vupparaboina, K. K., & Chhablani, J. (2018). Retinal and choroidal changes in steroid-associated central serous chorioretinopathy. International journal of retina and vitreous, 4, 11. (Year: 2018).*
Moreno-Ramos, T., Benito-LeÃ³n, J., Villarejo, A., & Bermejo-Pareja, F. (2013). Retinal nerve fiber layer thinning in dementia associated with Parkinson's disease, dementia with Lewy bodies, and Alzheimer's disease. Journal of Alzheimer's Disease, 34(3), 659-664. (Year: 2013).*
Ng WY, Ting DSW, Agrawal R, et al. Choroidal Structural Changes in Myopic Choroidal Neovascularization After Treatment With Antivascular Endothelial Growth Factor Over 1 Year. Investigative Ophthalmology & Visual Science. 2016;57(11):4933â4939. (Year: 2016).*
Panozzo, G., Parolini, B., & Mercanti, A. (2003, January). OCT in the monitoring of visual recovery after uneventful retinal detachment surgery. In Seminars in ophthalmology (vol. 18, No. 2, pp. 82-84). Taylor & Francis. (Year: 2003).*
Park HL, Jeon SJ, Park CK. Features of the Choroidal Microvasculature in Peripapillary Atrophy Are Associated With Visual Field Damage in Myopic Patients. Am J Ophthalmol. Aug. 2018;192:206-216. doi: 10.1016/j.ajo.2018.05.027. Epub Jun. 5, 2018. PMID: 29883586. (Year: 2018).*
Tan KA, Laude A, Yip V, Loo E, Wong EP, Agrawal R. Choroidal vascularity index—a novel optical coherence tomography parameter for disease monitoring in diabetes mellitus? Acta Ophthalmol. 2016;94(7):E612âE616. (Year: 2016).*
Zhou, H., et al. Age-related changes in choroidal thickness and the volume of vessels and stroma using swept source OCT and fully automated algorithms. Ophthalmol Retina. 2020; 4 (2): 204-215. (Year: 2020).*
Japanese Office Action issued Dec. 12, 2023, in corresponding Japanese Patent Application No. 2022-567801, 8 pages.
International Search Report and Written Opinion mailed on Oct. 1, 2021, received for PCT Application PCT/JP2021/023628, filed on Jun. 22, 2021, 12 pages.
Zhou et al., "Automated 2D and 3D assessment of choroidal thickness and vasculature with swept-source OCT", Investigative Ophthalmology & Visual Science, ARVO Annual Meeting Abstract, Association for Research in Vision and Ophthalmology, vol. 60, No. 9, Jul. 1, 2019, 4 pages.
Singh et al., "Choroidal imaging biomarkers", Survey of Ophthalmology, Science Direct, vol. 64, No. 3, Nov. 26, 2018, pp. 312-333.
Ibrahim et al., "Segmenting and Labeling Blood Vessels in Choroidal Haller's Layer: A Multiple Target Tracking Approach", IEEE EMBS International Conference on Biomedical & Health Informatics (BHI), Feb. 16, 2017, pp. 113-116.
Communication pursuant to Areticle 94(3) EPC issued May 22, 2025, in corresponding European Patent Application No. 21 740 253.6, 3pp.

* cited by examiner

[Fig. 1]
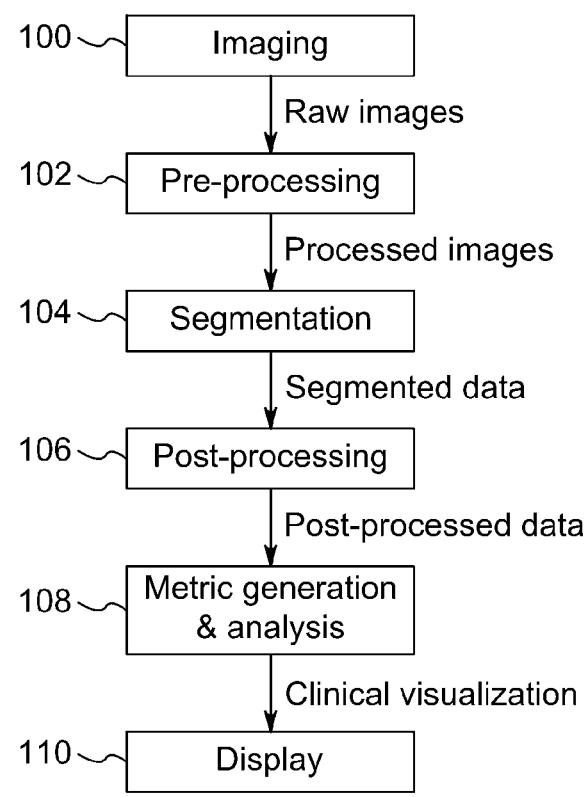

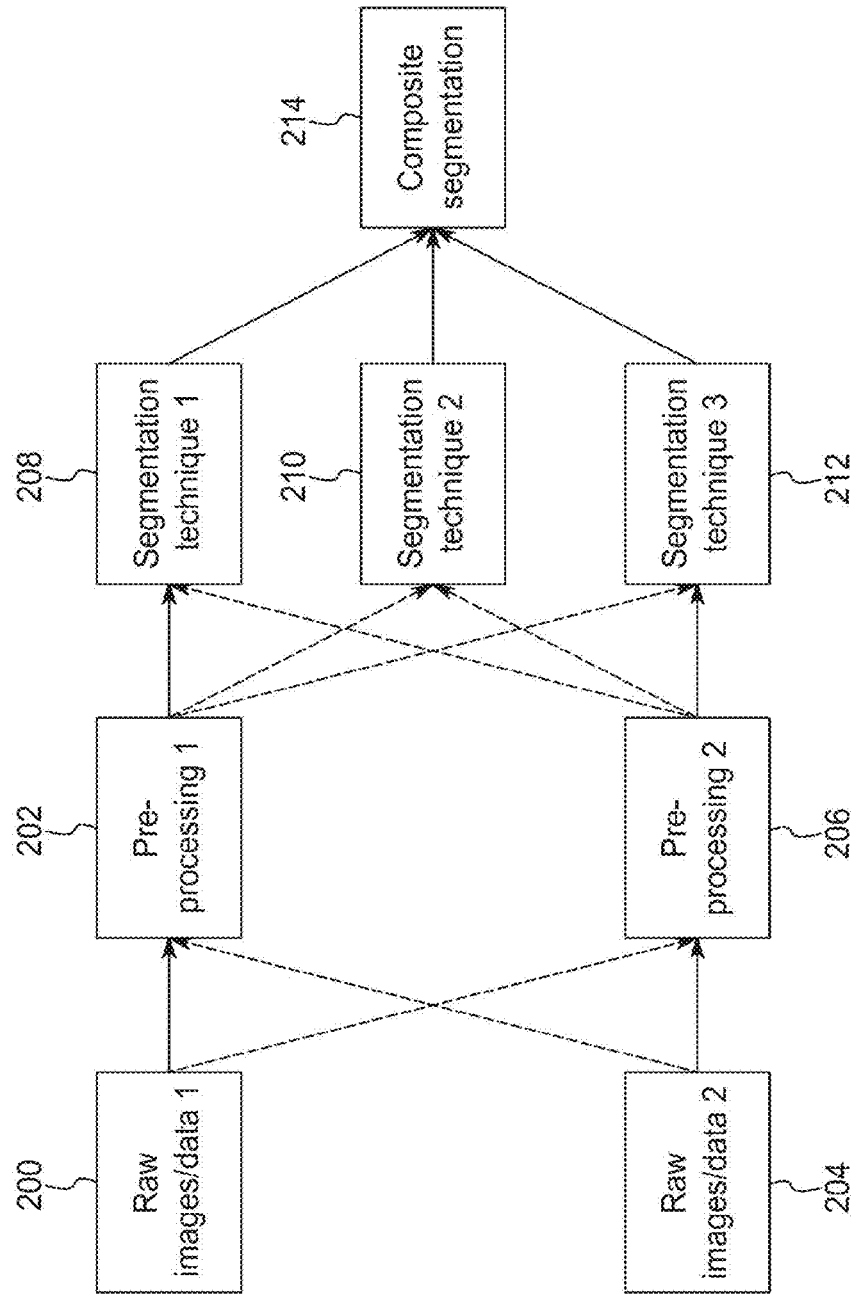

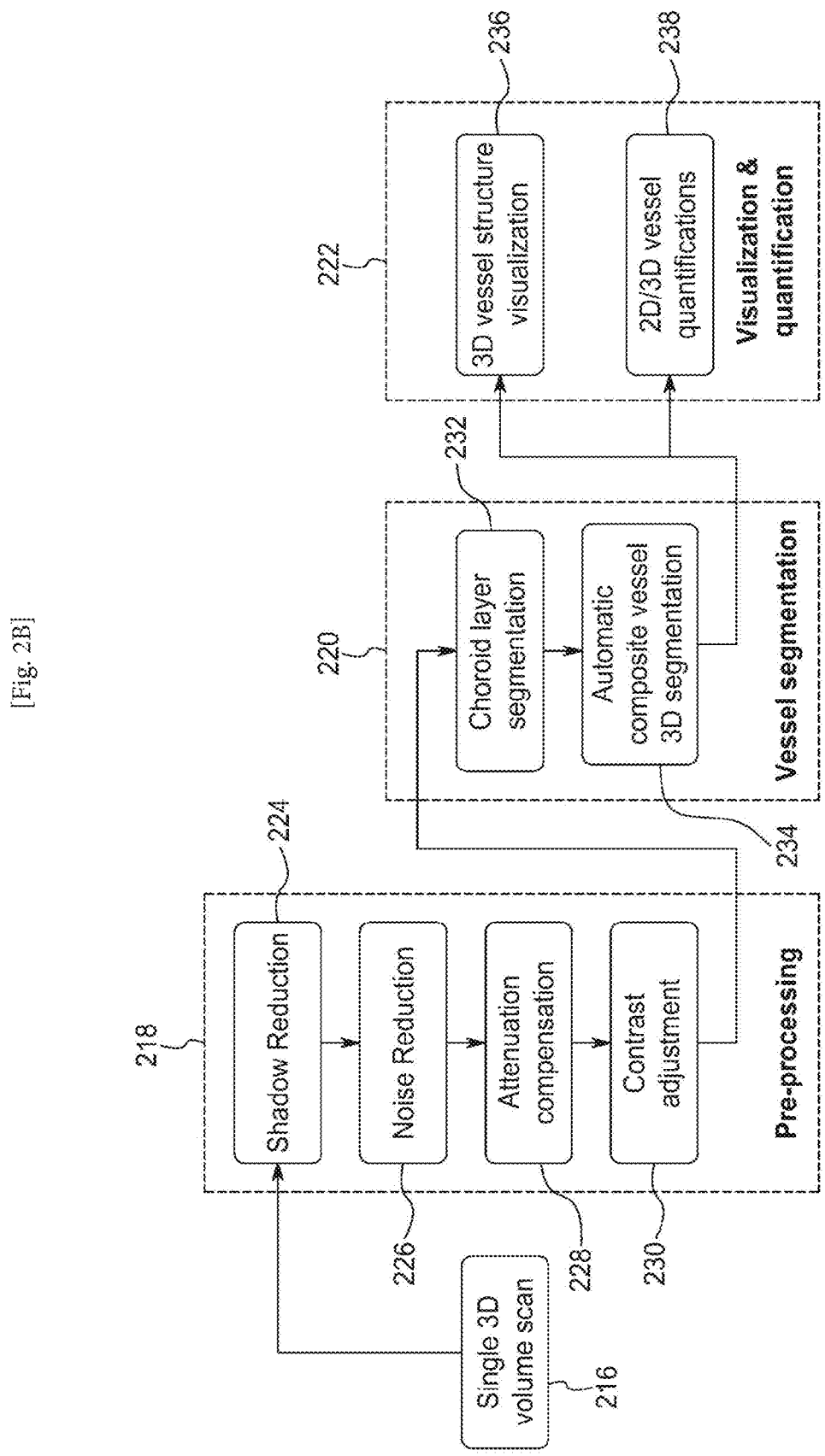
[Fig. 2B]

[Fig. 3A]
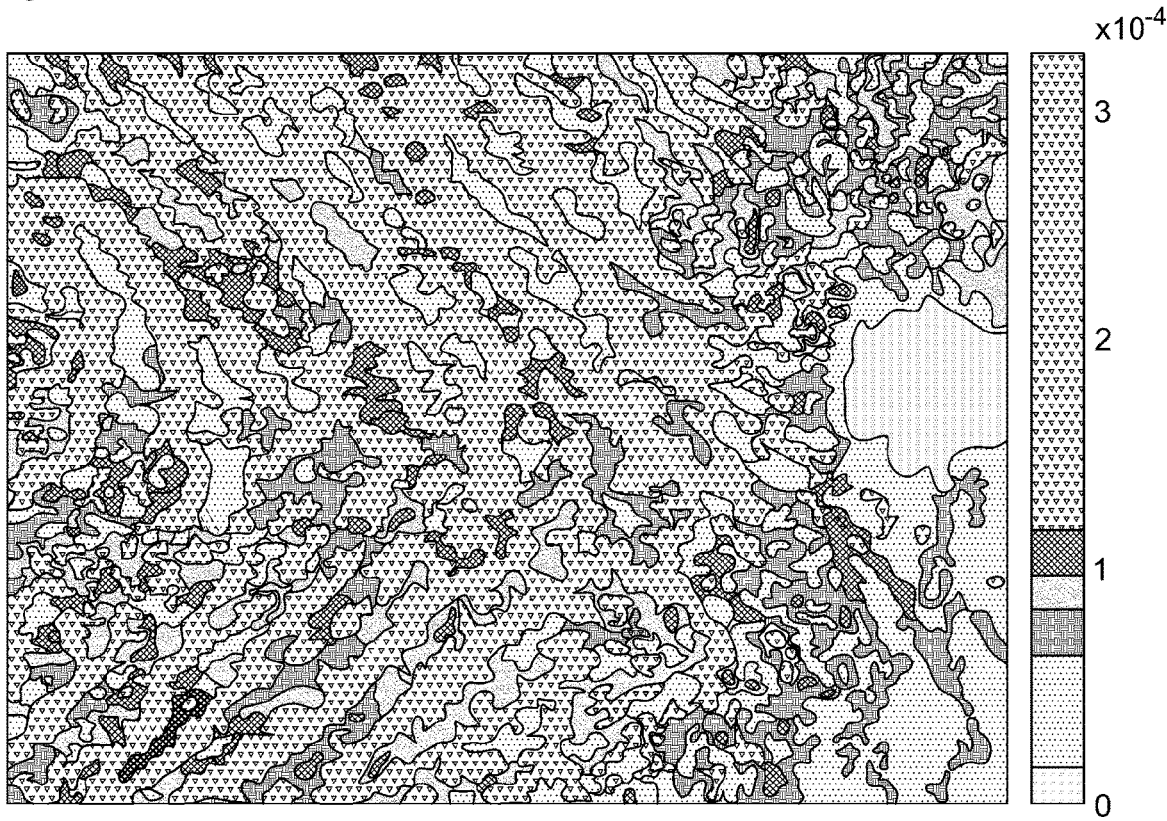
[Fig. 3B]
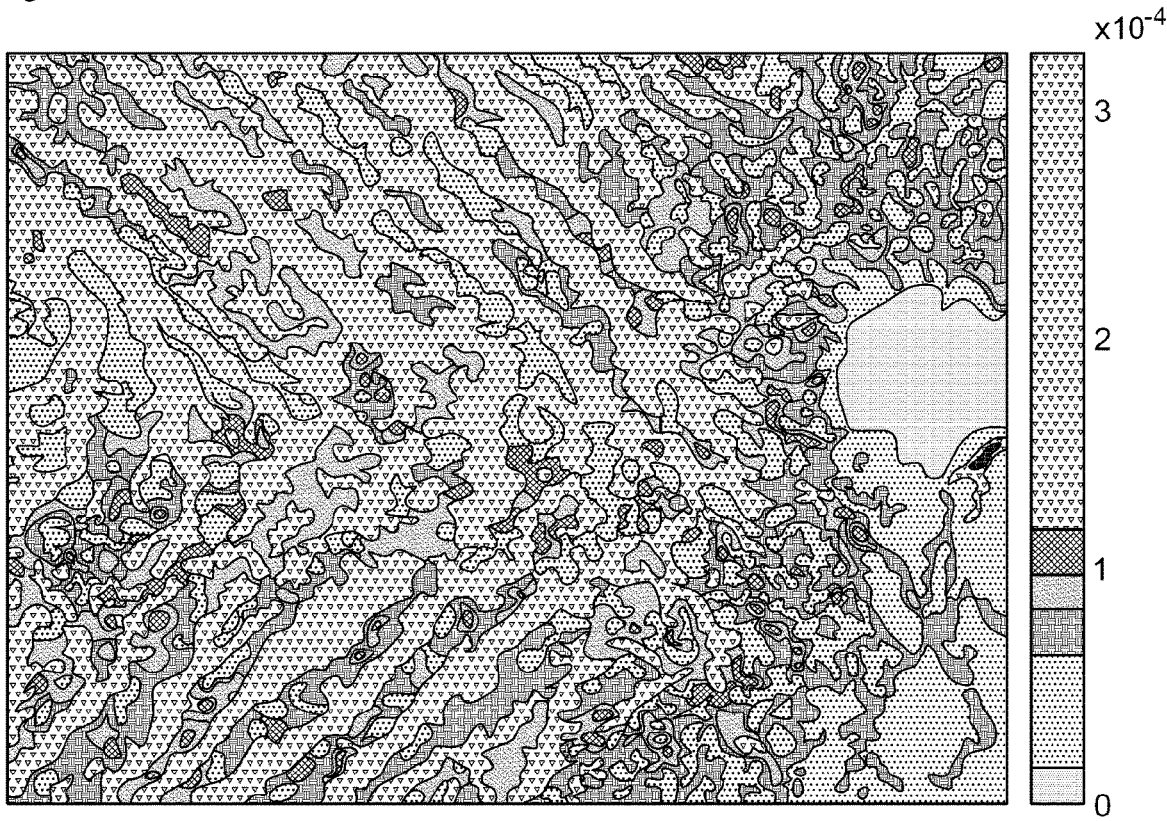

[Fig. 3C]
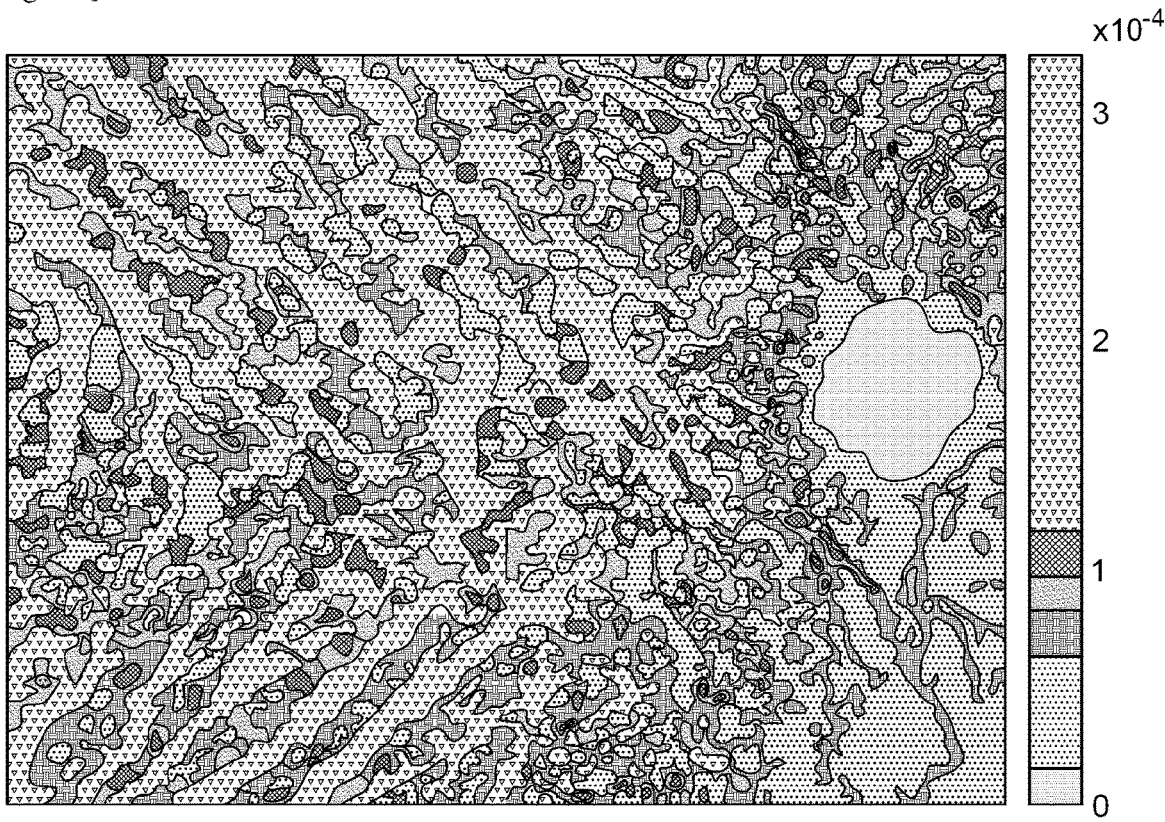
[Fig. 3D]
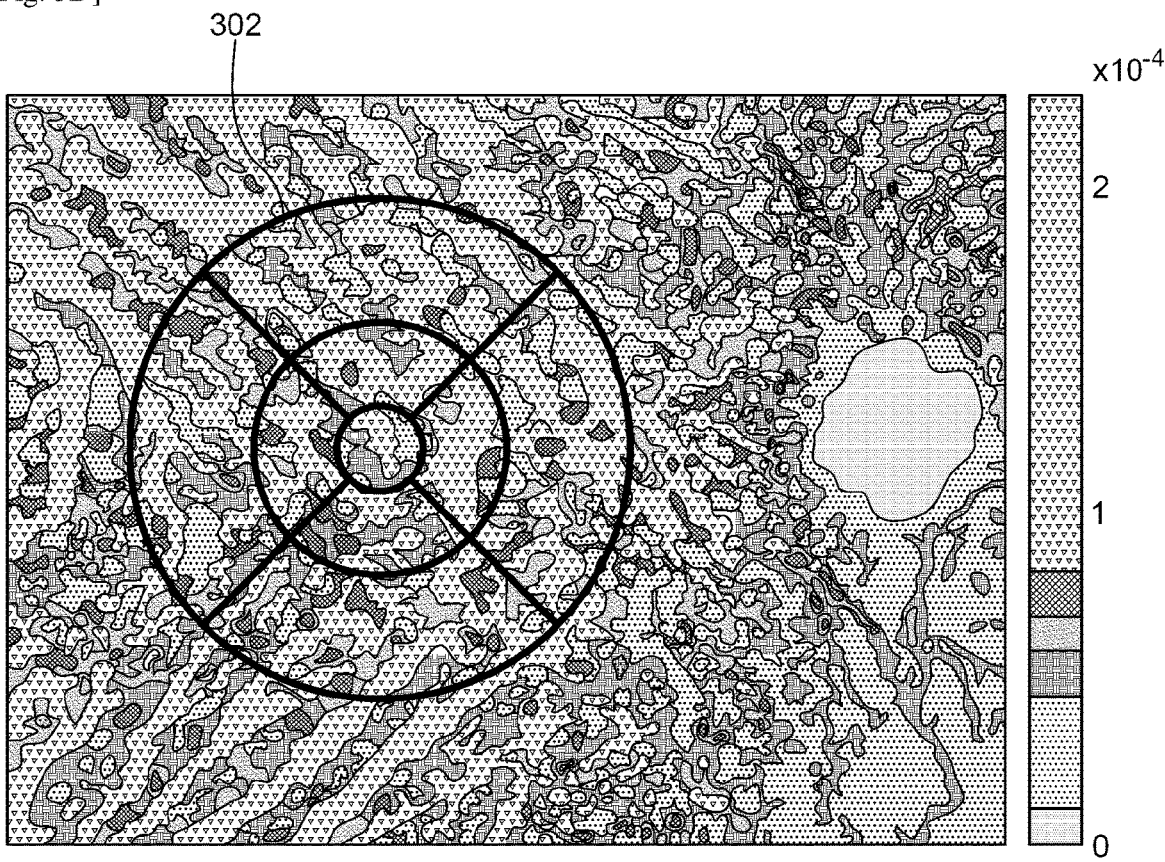

[Fig. 4A]
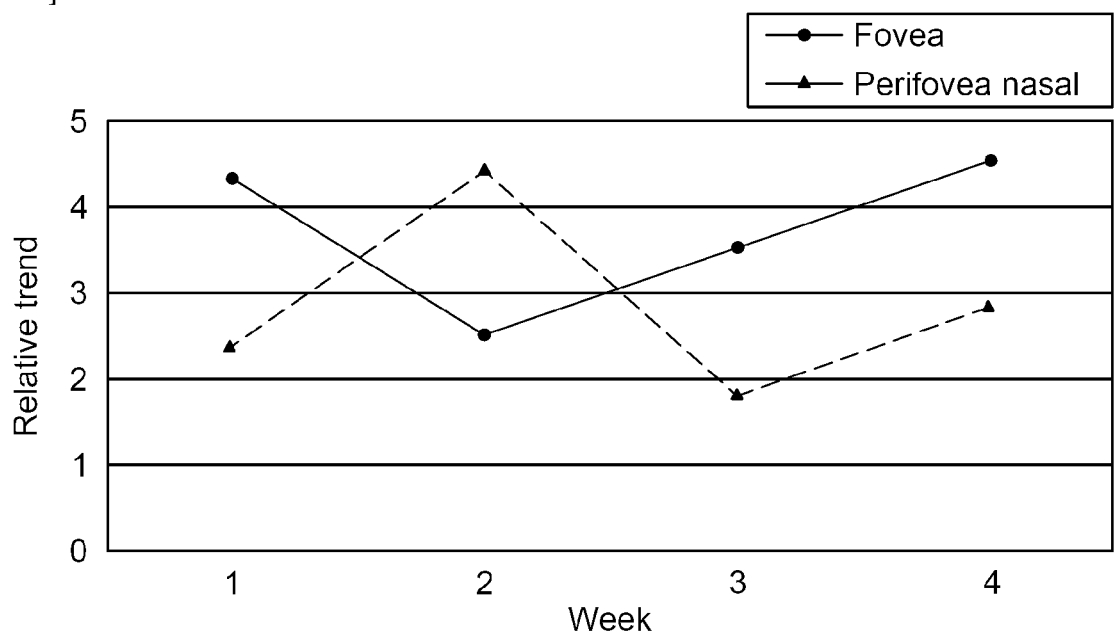
[Fig. 4B]
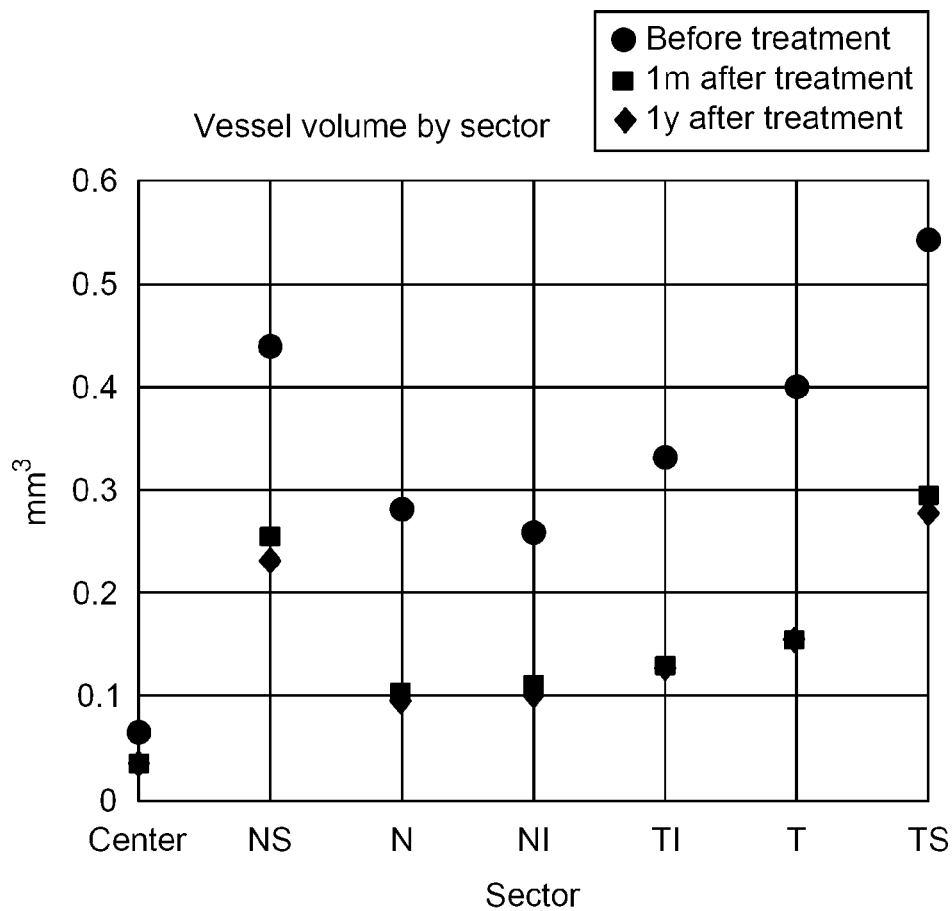

[Fig. 5]
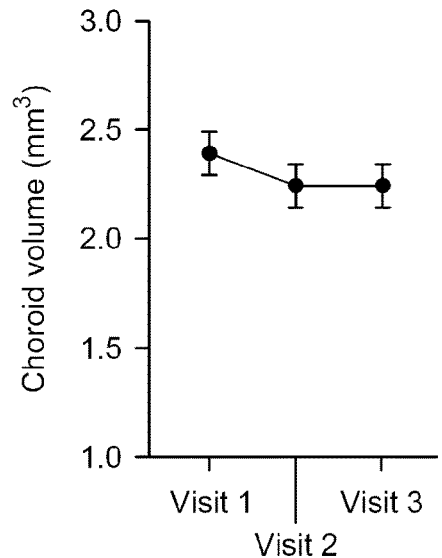
[Fig. 6]
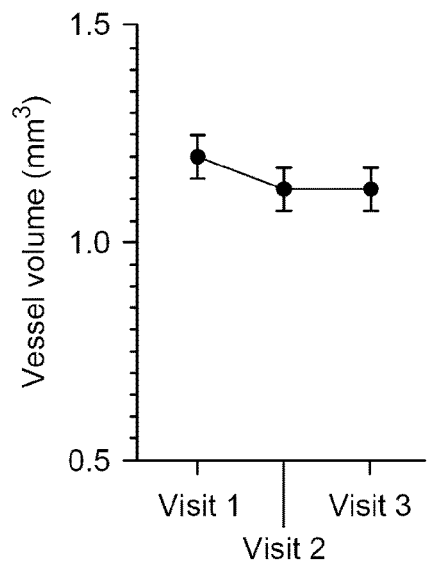
[Fig. 7]
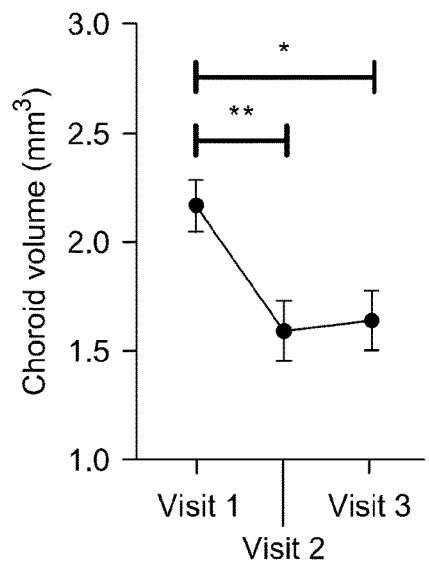

[Fig. 8]
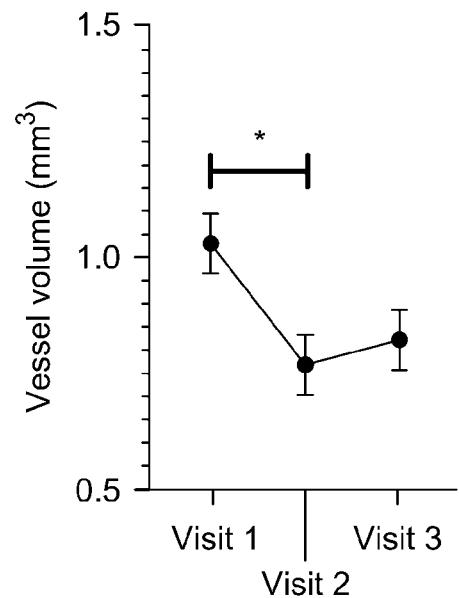
[Fig. 9]
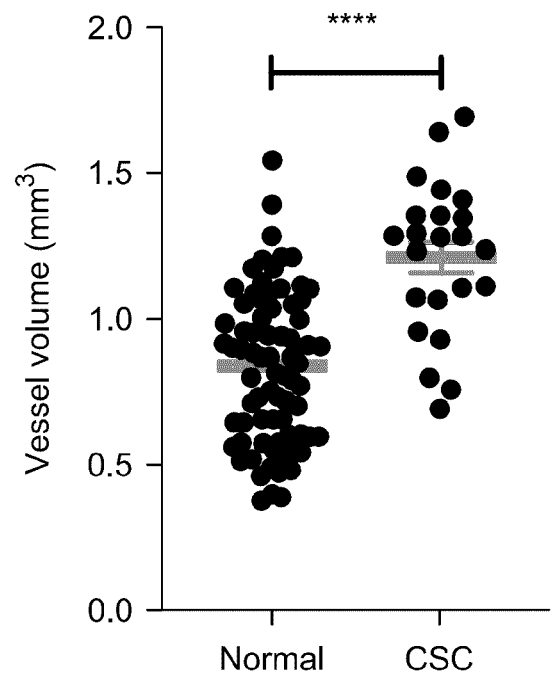

[Fig. 10]
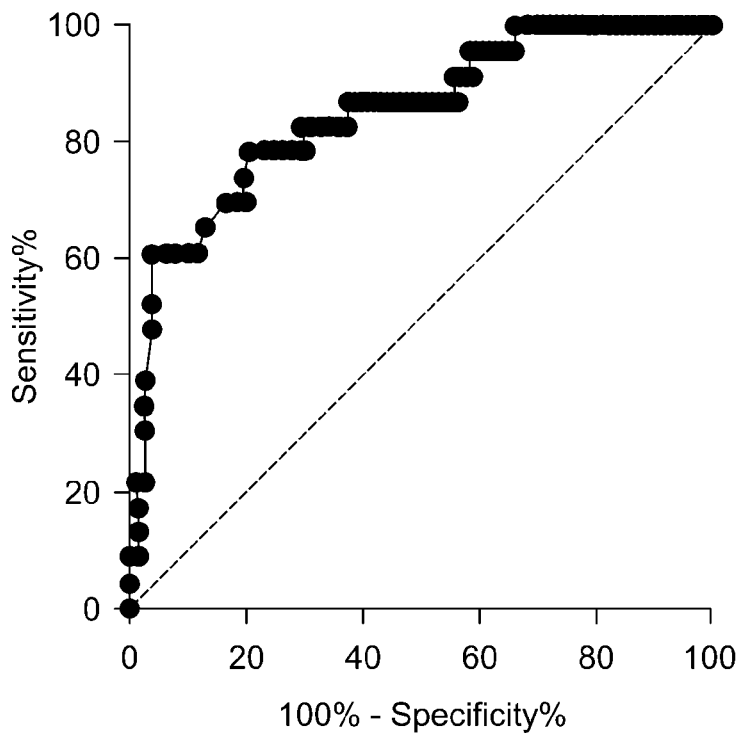
[Fig. 11]
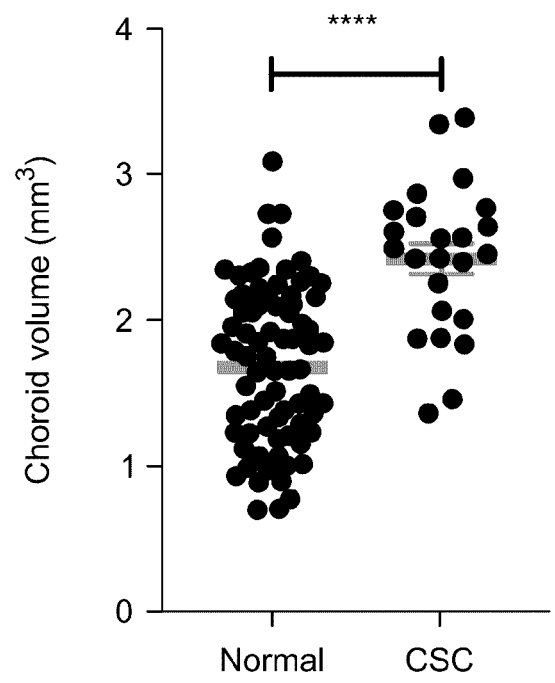

[Fig. 12]
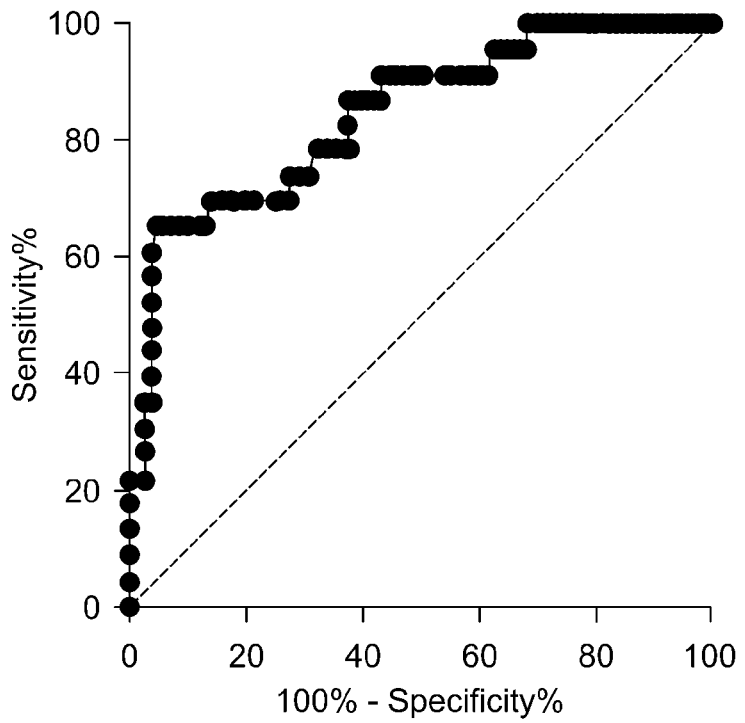
[Fig. 13]
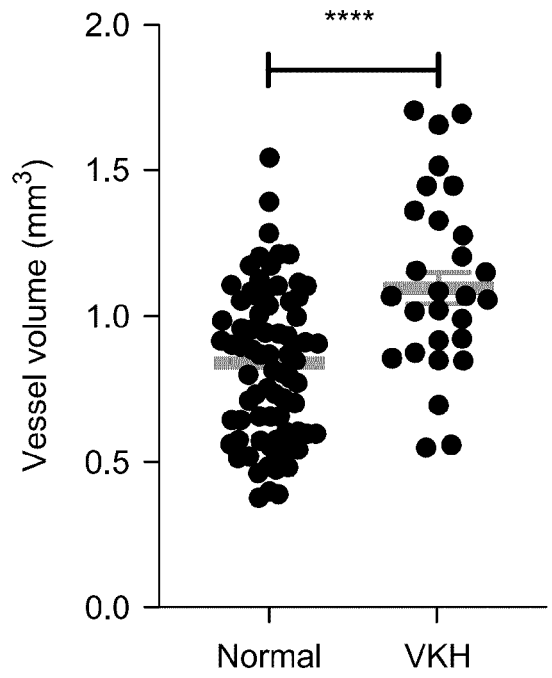

[Fig. 14]
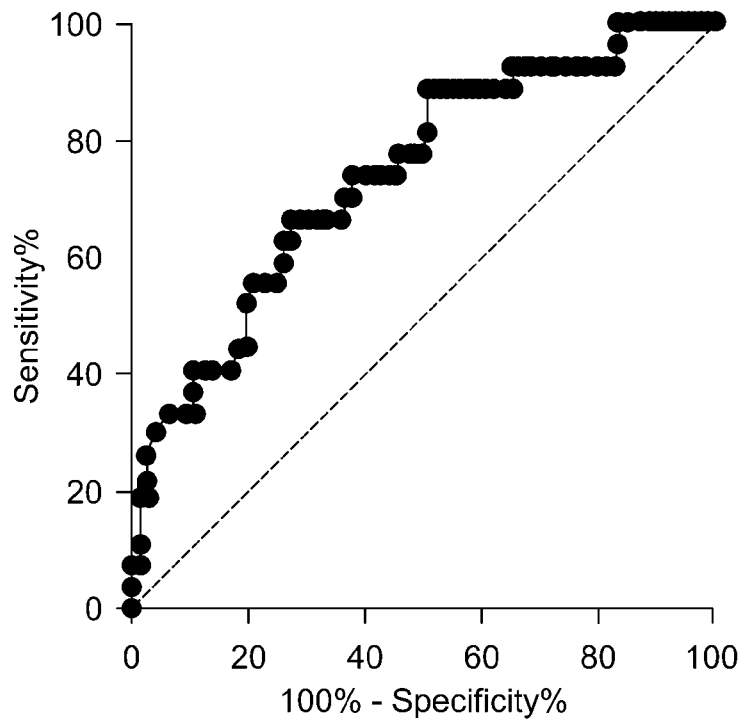
[Fig. 15]
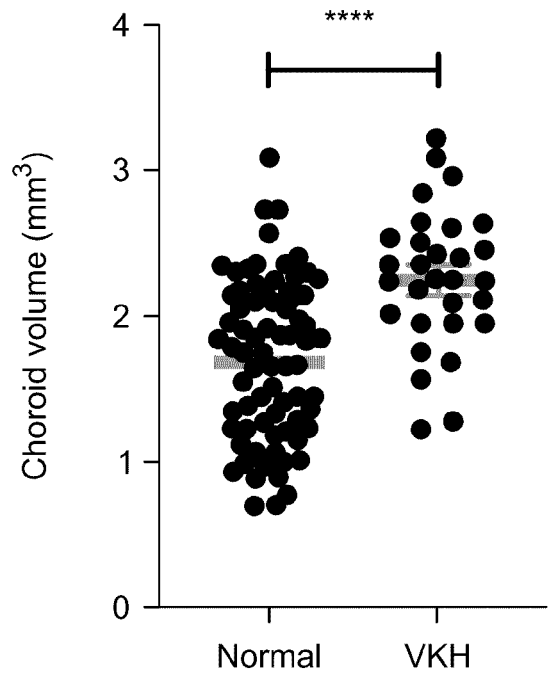

[Fig. 16]
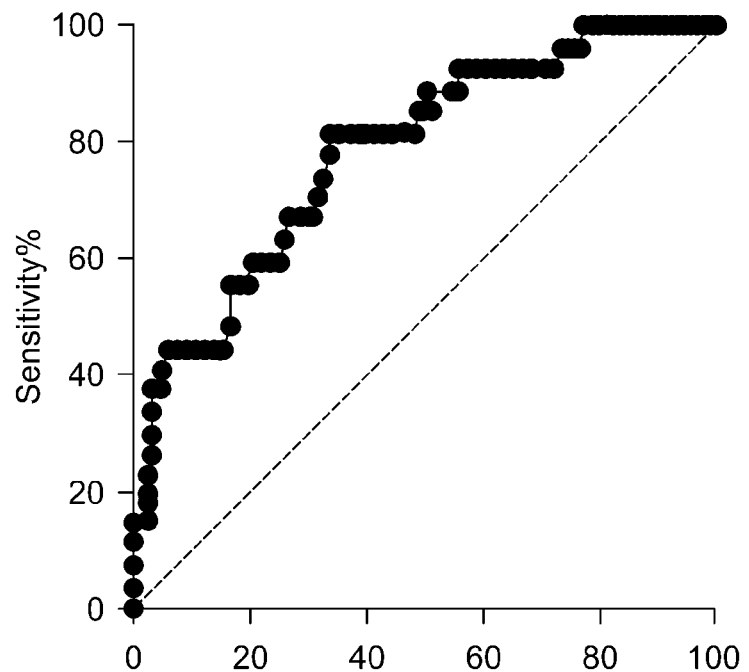
[Fig. 17]
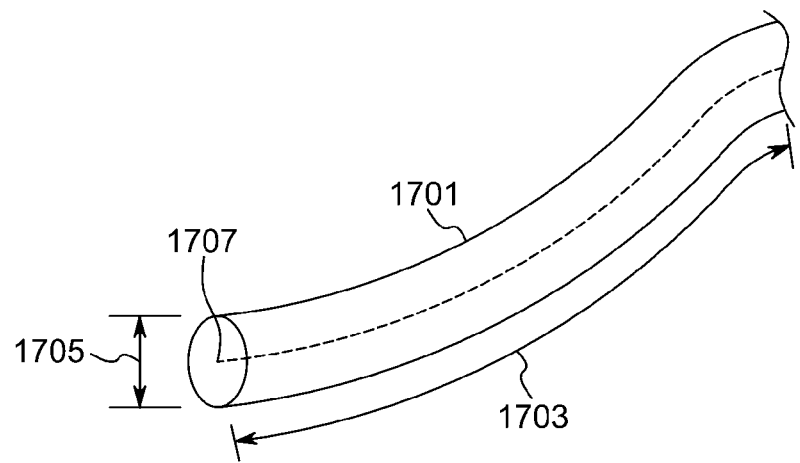

[Fig. 18]
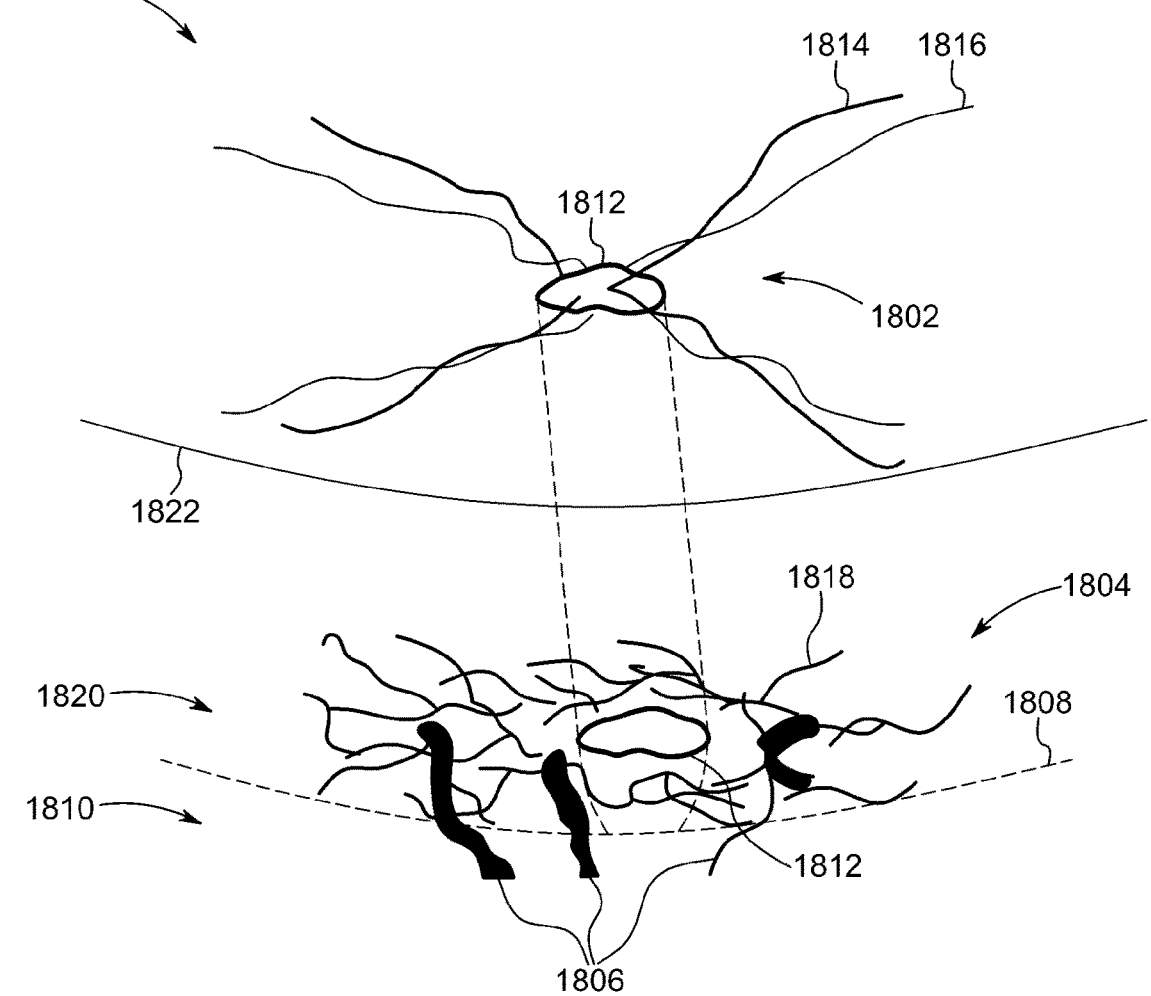
[Fig. 19]
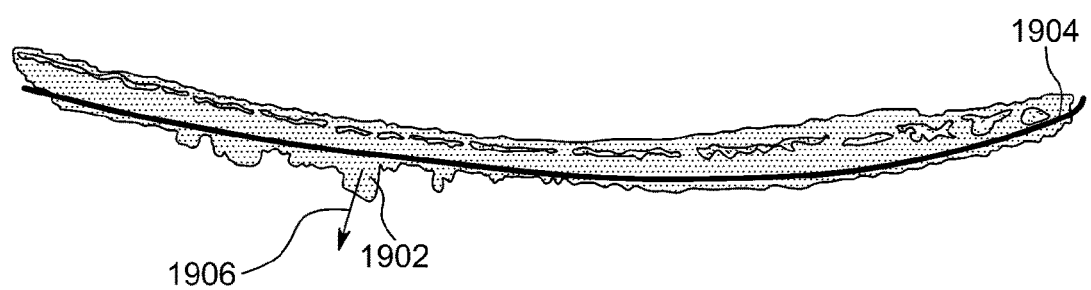

[Fig. 20A]
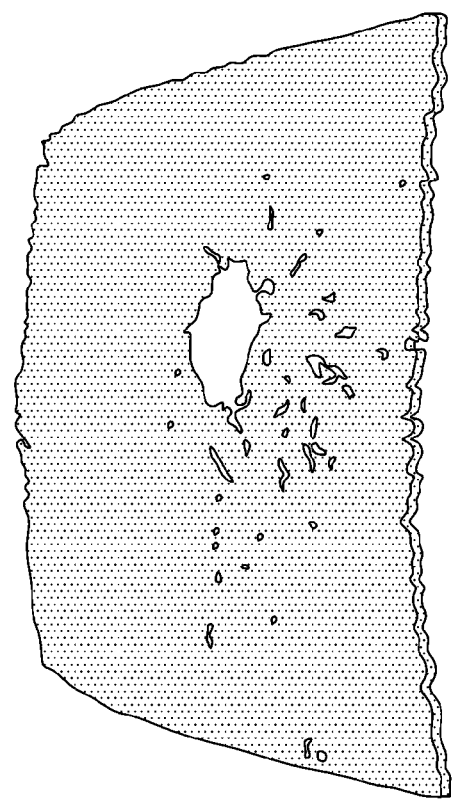
[Fig. 20B]
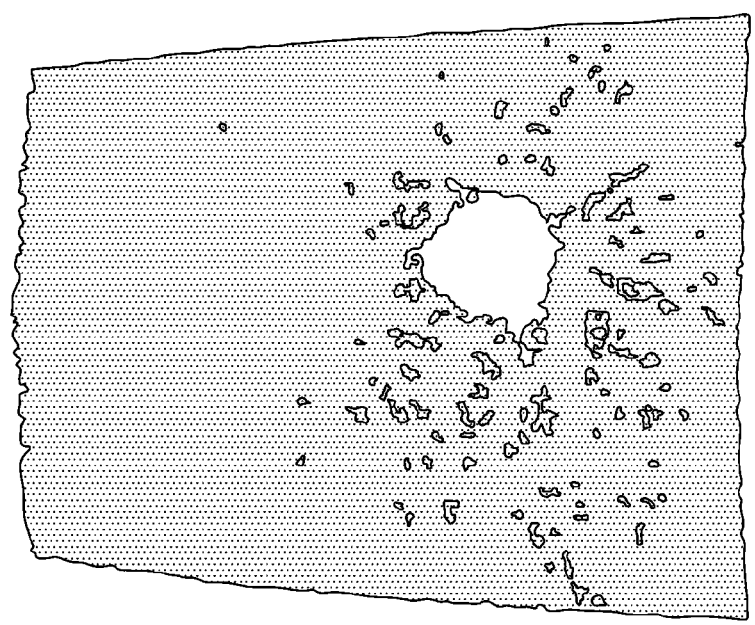

[Fig. 20C]
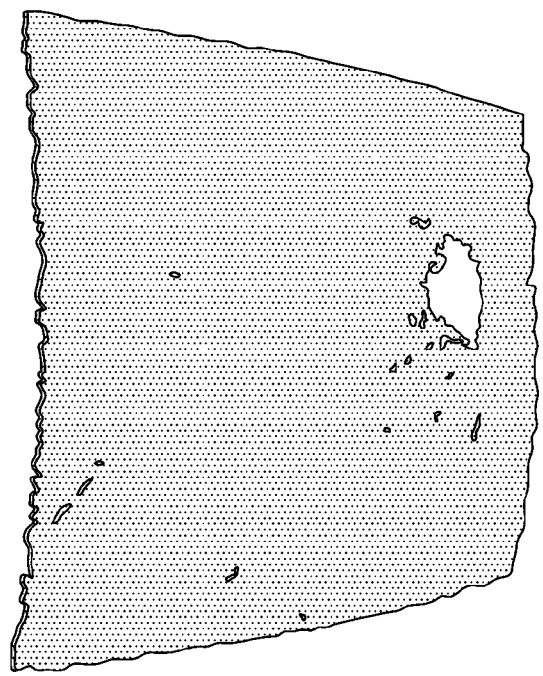
[Fig. 20D]
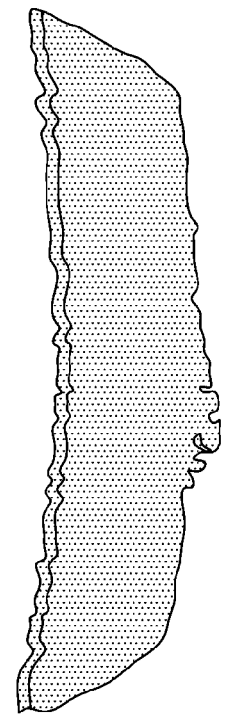

[Fig. 20E]
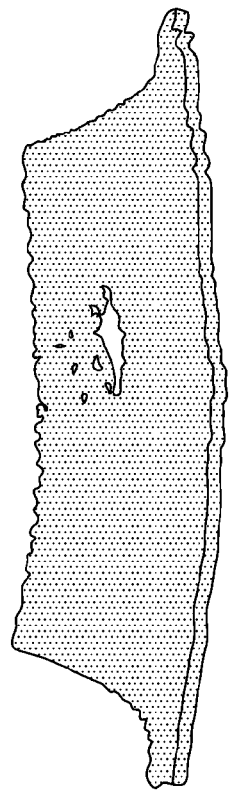
[Fig. 20F]
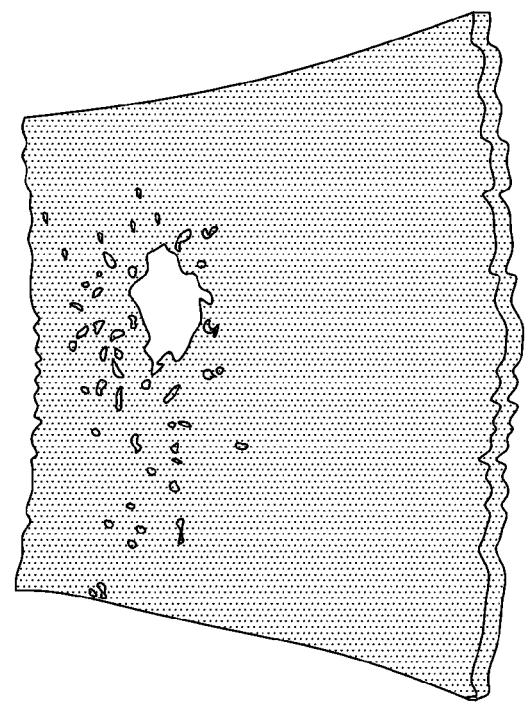

[Fig. 20G]
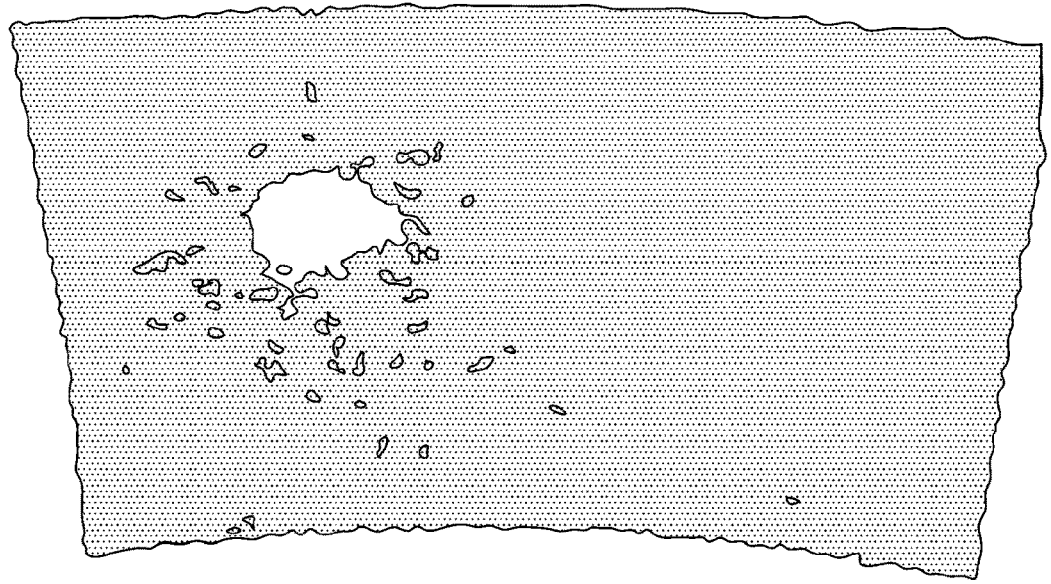
[Fig. 20H]
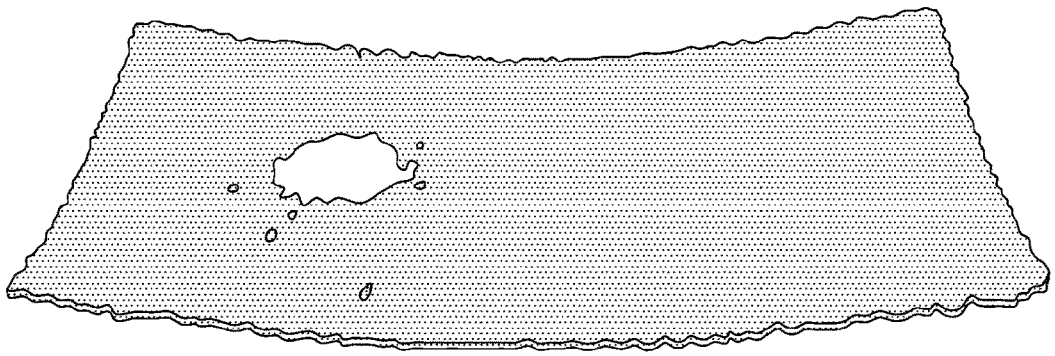
[Fig. 20I]
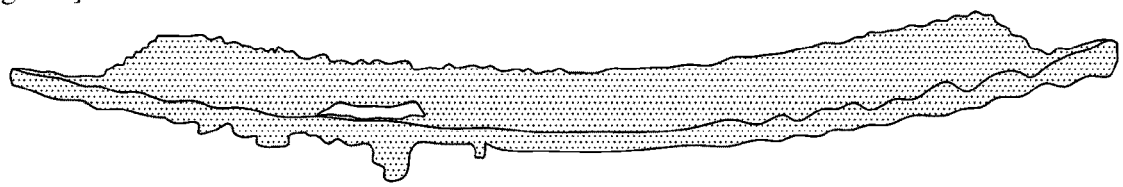
[Fig. 20J]
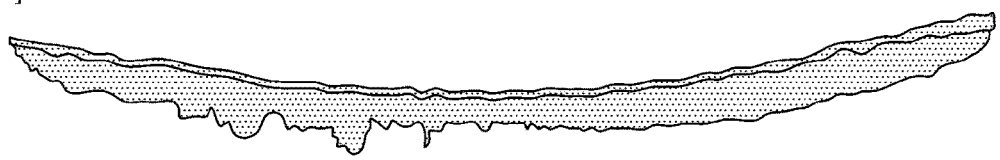
[Fig. 20K]
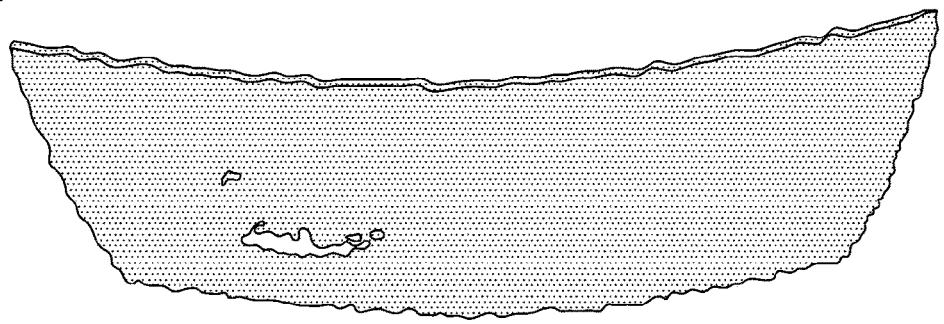

[Fig. 20L]
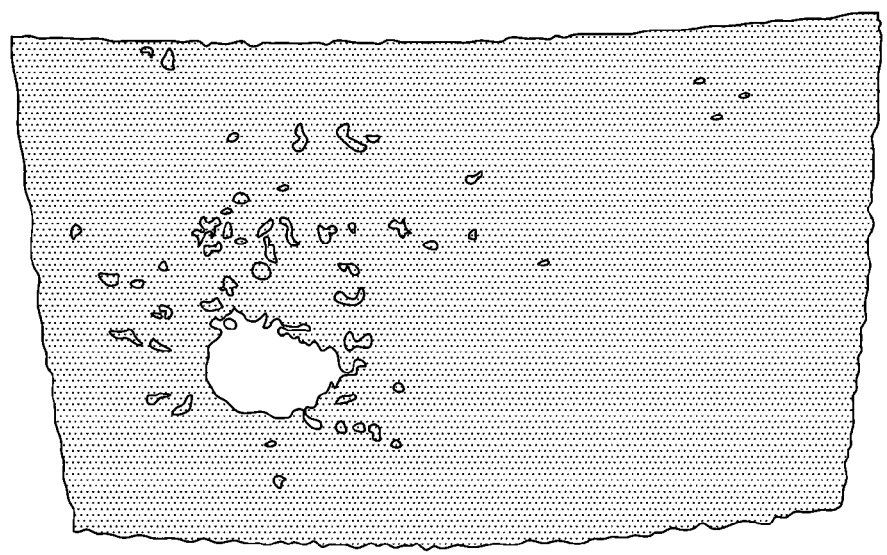

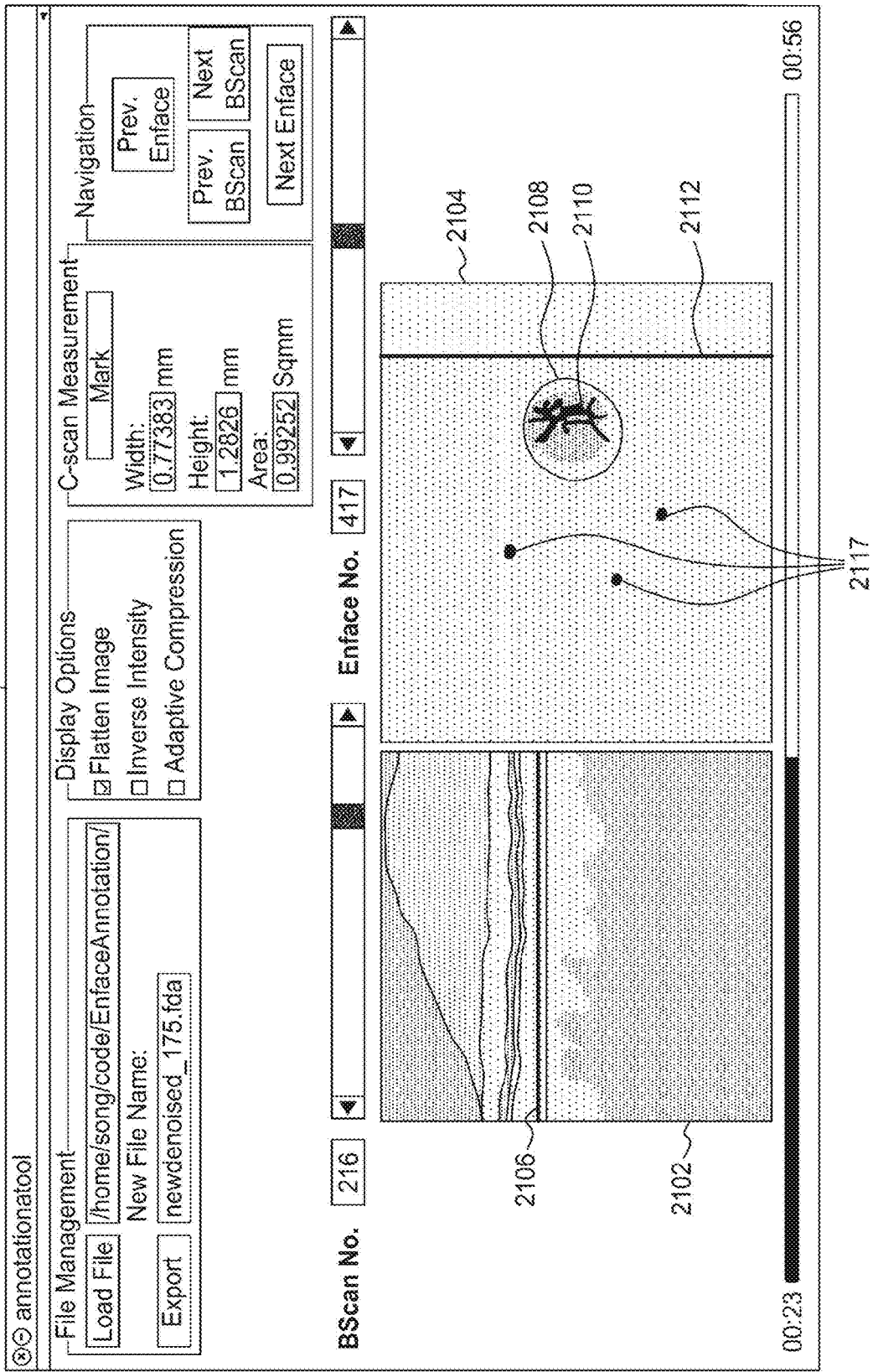
[Fig. 21A]

[Fig. 21B]
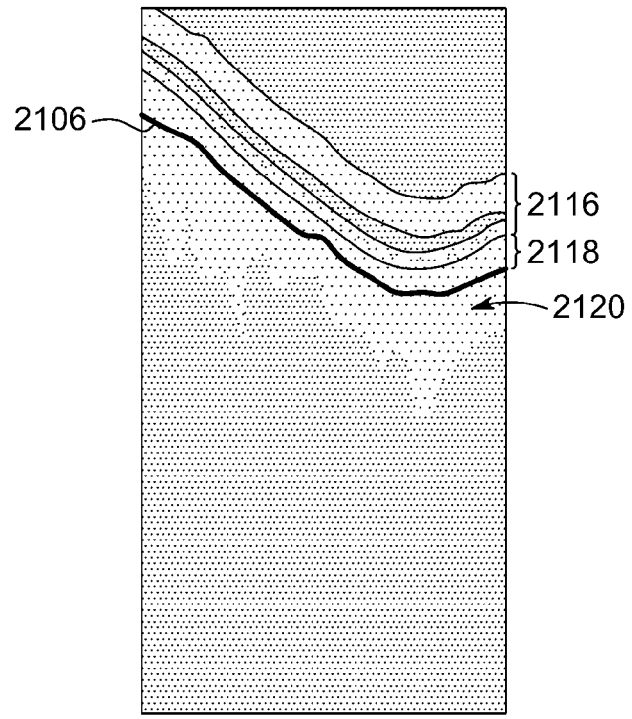
[Fig. 21C]
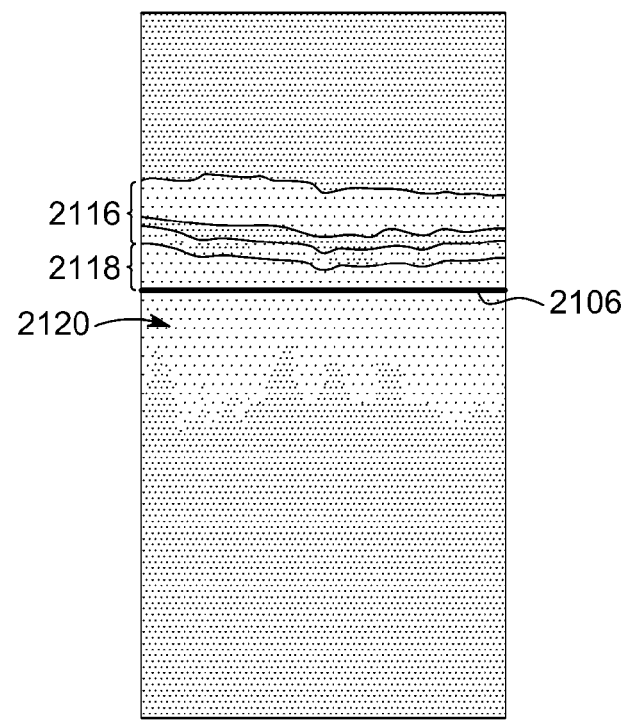

[Fig. 22]
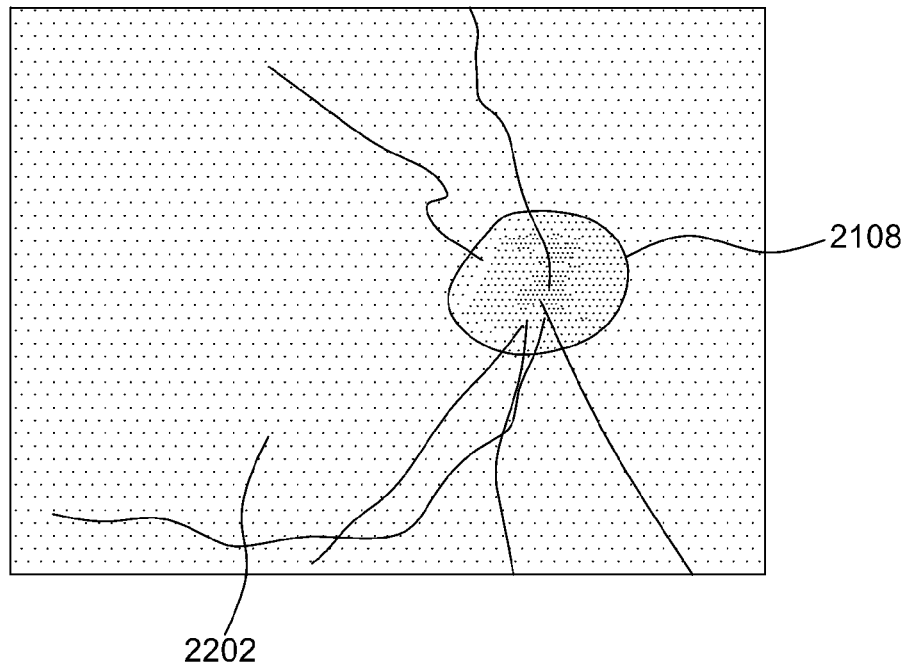
[Fig. 23]
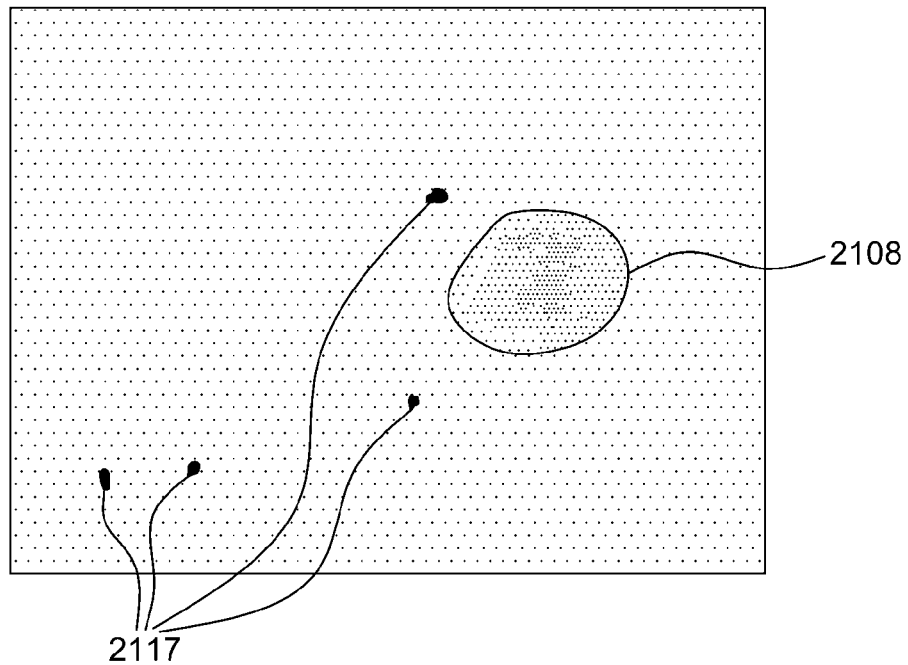

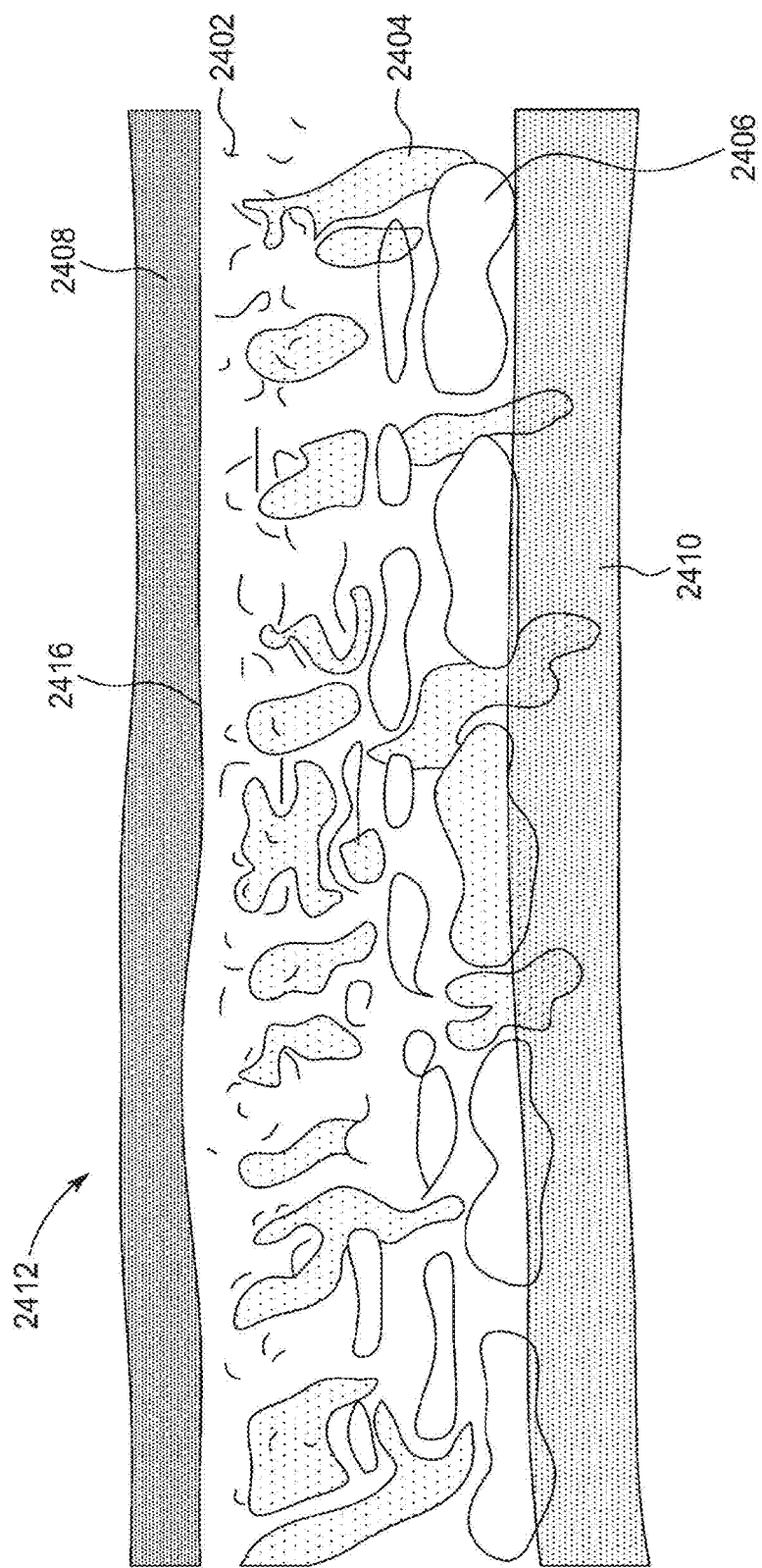
[Fig. 24]

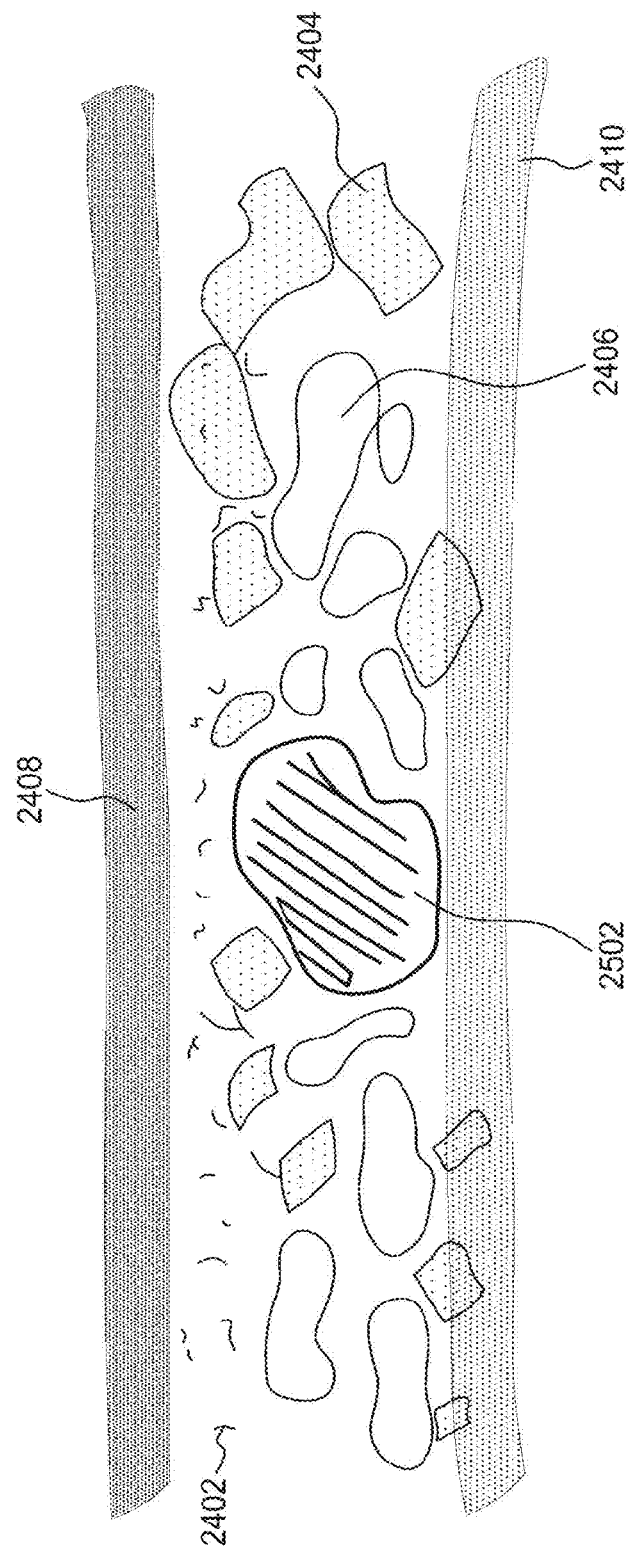
[Fig. 25]

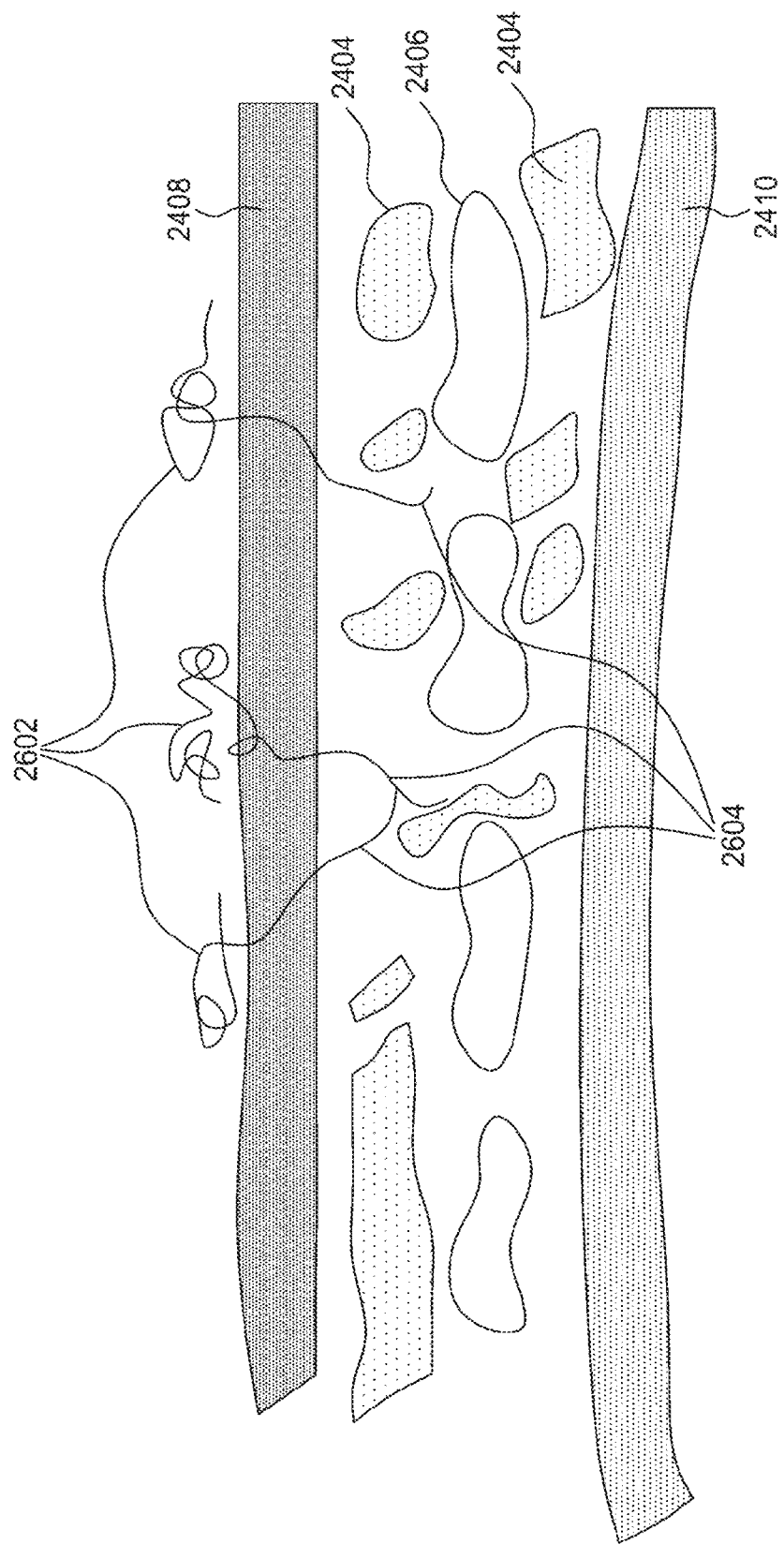
[Fig. 26]

[Fig. 27A]
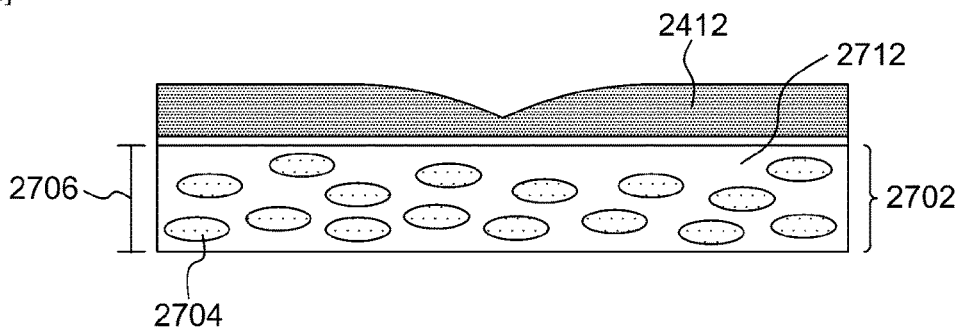
[Fig. 27B]
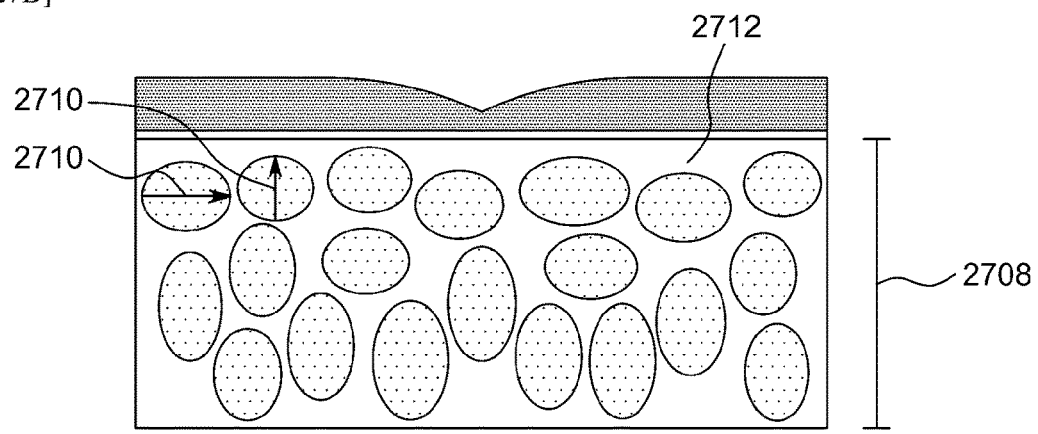
[Fig. 27C]
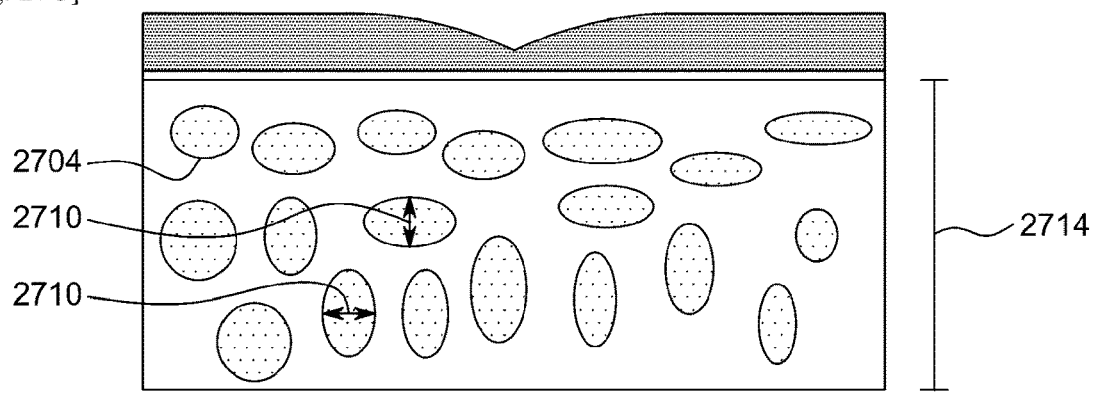
[Fig. 28A]
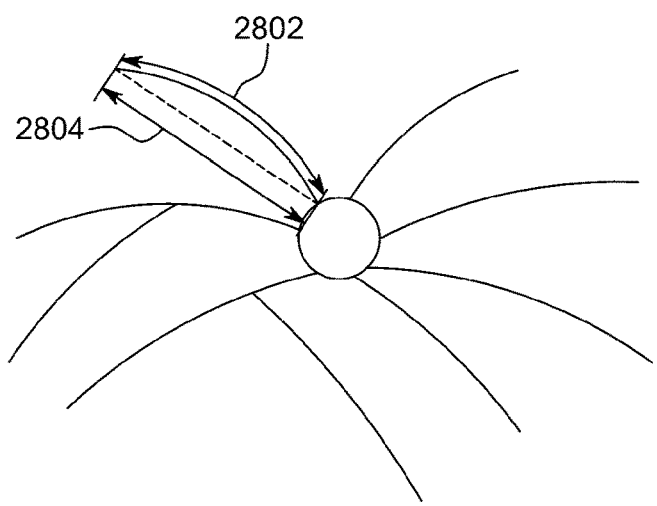

[Fig. 28B]
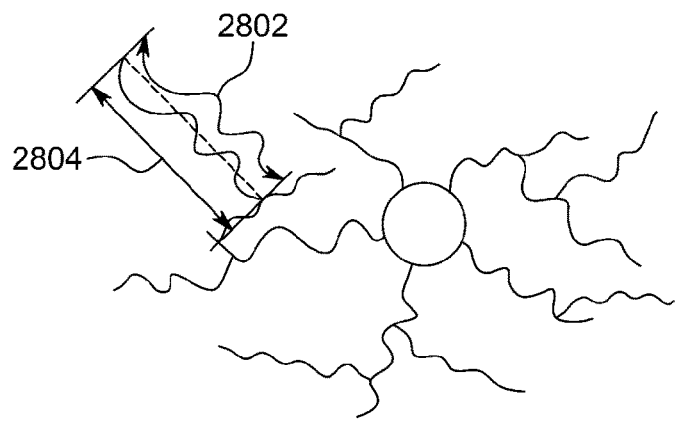
[Fig. 29A]
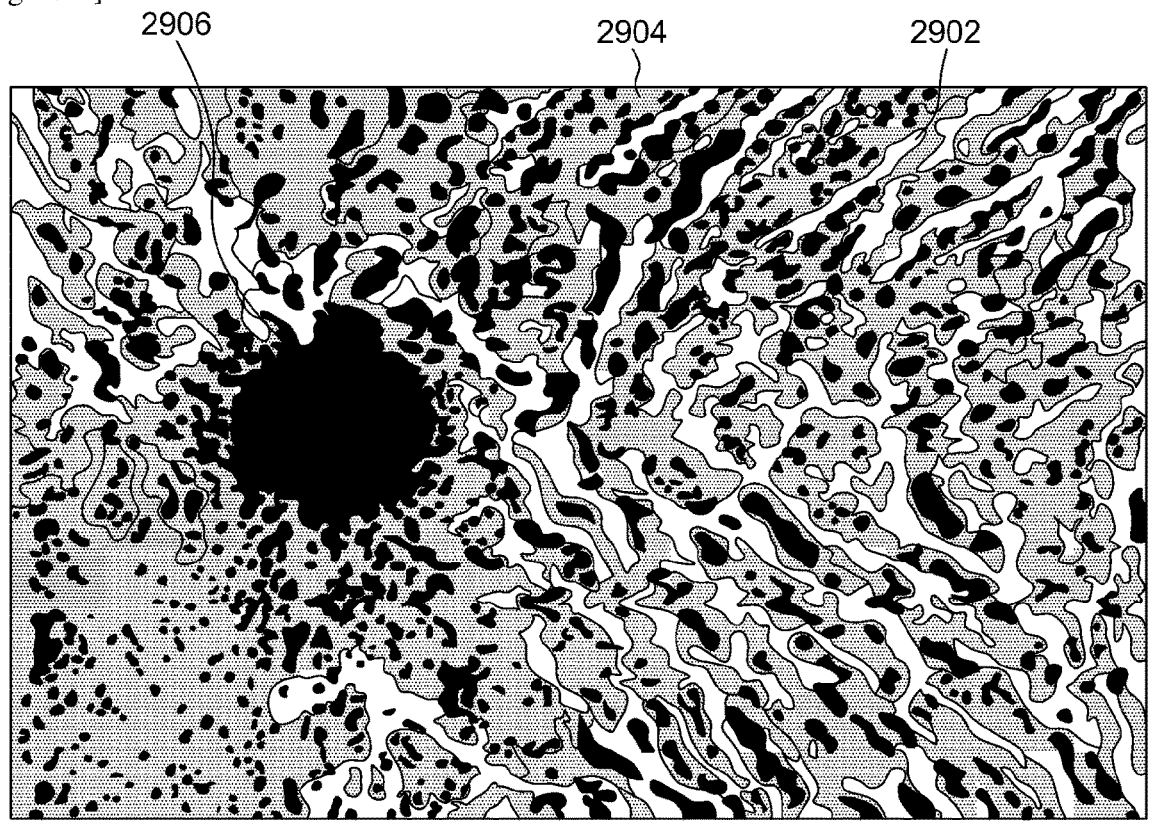

[Fig. 29B]
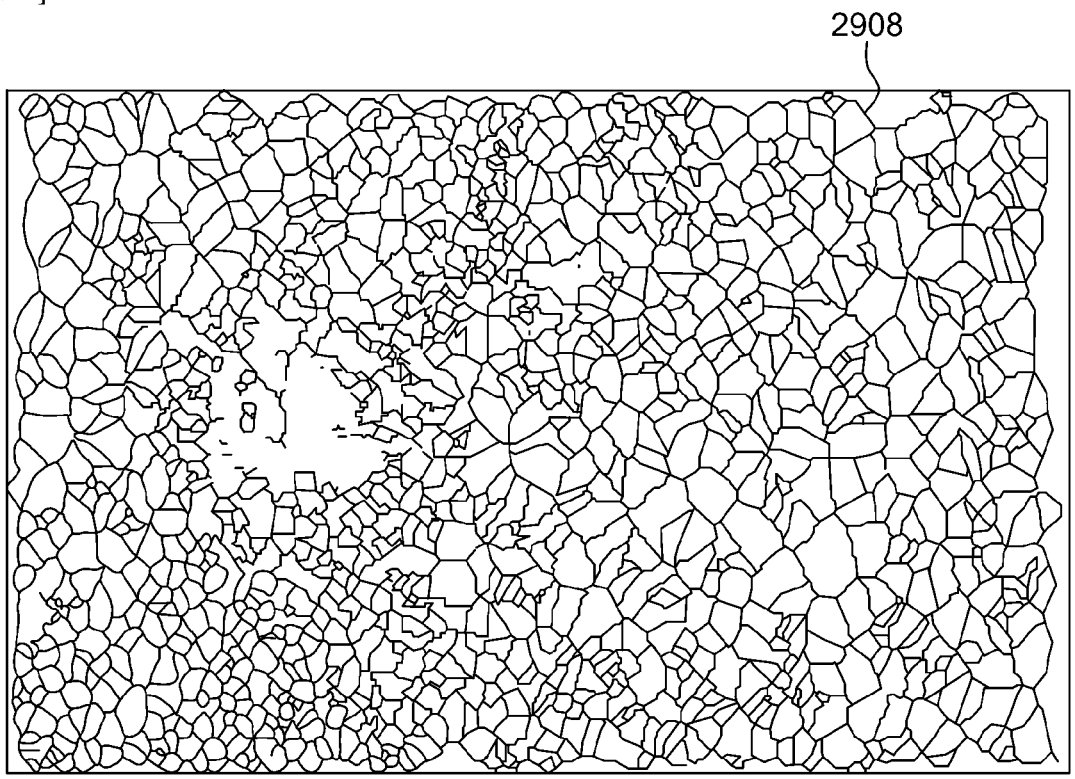
[Fig. 30]
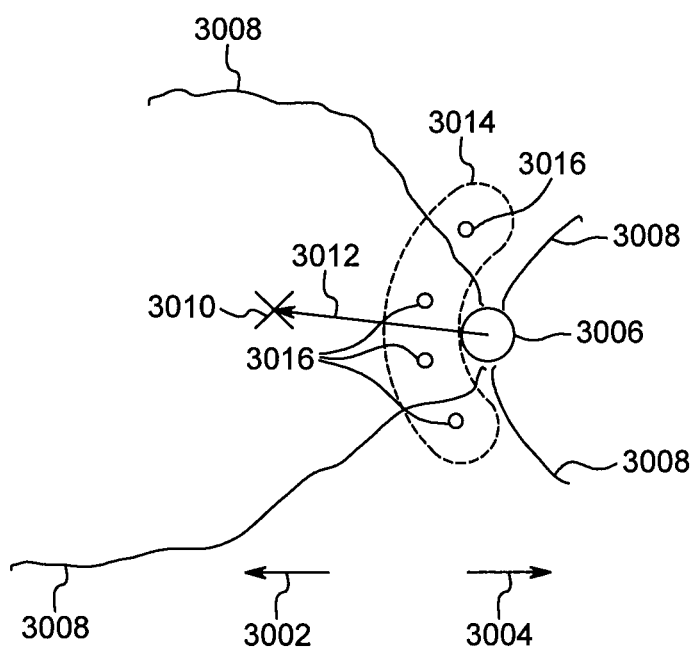

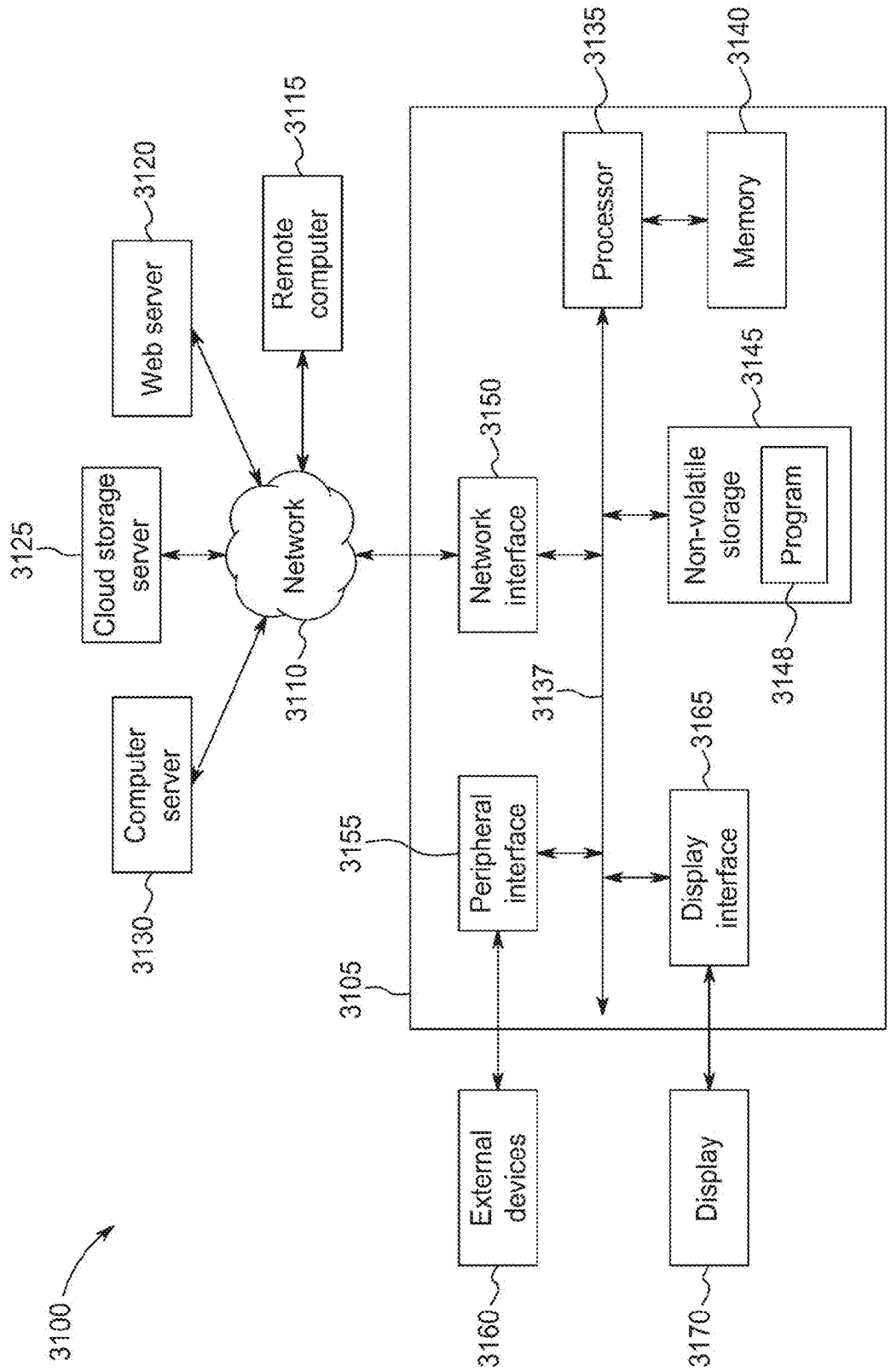

MEDICAL DIAGNOSTIC APPARATUS AND METHOD FOR EVALUATION OF PATHOLOGICAL CONDITIONS USING 3D OPTICAL COHERENCE TOMOGRAPHY DATA AND IMAGES

CROSS-REFERENCE TO RELATED APPLICATIONS

This application is based on PCT filing PCT/JP2021/023628, filed Jun. 22, 2021, which claims the benefit of U.S. Provisional Application No. 63/045,508, filed on Jun. 29, 2020, the entire contents of each are incorporated by reference herein.

FIELD

The present disclosure relates generally to analysis of data and images for monitoring, evaluation, and diagnosis of medical conditions, and in particular to the analysis of three-dimensional (3D) optical coherence tomography (OCT) data and images for monitoring, evaluation, and diagnosis of medical conditions.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

OCT is a technique for in-vivo imaging and analysis of various biological tissues (as, for example, two-dimensional slices and/or three-dimensional volumes). Images created from three-dimensional (3D) volumetric OCT data show different appearances/brightness for different components of the imaged tissue. Based on this difference, those components can be segmented out from the images for further analysis and/or visualization. For example, choroidal vasculature has a darker appearance than choroidal stroma in OCT images. Therefore, the choroidal vasculature in OCT images can be segmented out by applying an intensity threshold. However, due to inherent properties of OCT imaging, artifacts in vessel segmentation will emerge if the thresholding is directly applied to the images. Other techniques have thus been developed to segment components of OCT data, but these too suffer from various deficiencies and limitations.

For example, when determining luminal and stromal areas of the choroid by a local binarization method, a special imaging acquisition protocol (enhanced depth imaging (EDI)) and averaged line scans are needed to achieve sufficient quality at a depth being analyzed, and to avoid noisy results depending on the type of OCT system utilized. Further, in some cases the final threshold is applied manually. Using a choroidal vessel density measurement in 2D projection images lacks depth resolution and can suffer from shadow artifact. Similarly, automated detection of vessel boundaries in two-dimensional (2D) B-scans (even with machine-learning) can be affected by shadow artifacts and is additionally limited to application only or for larger vessels only. Further, the segmented vessel continuity may be poor due to the segmentation being performed for each B-scan in a volume, rather than applied to the volume as a whole. This can thus require each segmented B-scan to be spliced or otherwise pieced together to generate a segmented volume. Other segmentation techniques are only applicable for normal (non-diseased eyes) and suffer errors when retinal structure changes due to diseases. Further, some segmentations are subject to inaccuracies related to the application of noise reduction filters on underlying data.

In short, without noise reduction, averaging of repeated B-scans or along a depth direction is conventionally used to produce data from which the choroidal vasculature can be properly segmented. As a result, the segmentation can be limited in dimension and location. And still further, when applied to 3D data, computation time according to a conventional method can be so long as to limit the data that can be analyzed. Because of these limitations it has not been practical and/or not even possible to present many clinically valuable visualizations and quantifications of choroidal vasculature prior to the present invention. Quantifications taken from conventional OCT data are too noisy to use in an accurate analysis, utilize averages taken from many volumes, which can still suffer from noise and also requires increased scanning times (for each iterative volume from which the average is taken), or are limited to relatively small regions of interest (e.g., 1.5 mm under the fovea in single B-scan).

SUMMARY OF INVENTION

One aspect of some embodiments is a medical diagnostic apparatus, including: a receiver circuit that receives three-dimensional volumetric data of a subject's eye; a processor configured to separate portions of the three-dimensional volumetric data into separate segments, perform processing differently on each of the separate segments, and combine the separately processed segments to produce an enhanced three-dimensional volumetric data set. The processor is further configured to generate at least one diagnostic metric from the enhanced three-dimensional volumetric data set, and the processor is further configured to evaluate a pathological condition based on the at least one diagnostic metric.

The processor may be further configured to generate a visualization to render a three dimensional view of the diagnostic metric superimposed on a structure of the subject's eye.

The at least one diagnostic metric includes at least one of a choroidal vessel diameter, a choroidal vessel shape, a choroidal vessel density, a choroidal vessel positional distribution, a choroidal vessel tortuosity, a choroidal vessel index, a choroidal vessel volume, a choroidal stroma volume, a penetrating vessel length, a penetrating vessel direction, a penetrating vessel symmetry, a penetrating vessel number, a penetrating vessel density, a perineural vessel size, and a tumor size.

The pathological condition may be Central Serous Chorioretinitis (CSC) disease, and in that case the processor is further configured to evaluate a progress or risk of the CSC disease in the subject based on the diagnostic metric including a choroidal vessel volume, a choroidal stroma volume, and a vessel index.

The pathological condition may be Vogt-Koyanagi-Harada (VKH) disease, and in that case the processor is further configured to evaluate a progress or risk of the VKH disease in the subject based on the diagnostic metric including a choroidal vessel volume, a choroidal stroma volume, and a vessel index.

The pathological condition may be glaucoma, and in that case the processor is further configured to evaluate a progress or risk of the glaucoma in the subject based on the diagnostic metric including a number of perineural vessels that penetrate a sclera of the subject's eye, a morphology of the perineural vessels that penetrate the sclera, and a size of the perineural vessels that penetrate the sclera.

The pathological condition may be pathological myopia, and in that case the processor is further configured to evaluate a progress or risk of the pathological myopia in the subject based on the diagnostic metric including a change in a choroidal vessel volume over time and a number, density, or morphology of penetrating vessels.

The pathological condition may be Peripapillary Atrophy (PPA), and in that case the processor is further configured to evaluate a progress or risk of the PPA in the subject based on the diagnostic metric including a choroidal vessel volume and a choroidal stroma volume.

The pathological condition may be recovery from retinal detachment surgery, and in that case the processor is further configured to evaluate a progress of the recovery form retinal detachment surgery in the subject based on the diagnostic metric including a choroidal vessel volume and a choroidal stroma volume.

The pathological condition may be at least one of hypertension and hyperlipidemia, and in that case the processor is further configured to evaluate a progress or risk of the at least one of the hypertension and hyperlipidemia in the subject based on the diagnostic metric including a choroidal vessel volume and a choroidal stroma volume.

The pathological condition may be dementia or Alzheimer's disease, and in that case the processor is further configured to evaluate a progress or risk of the dementia or Alzheimer's disease in the subject based on the diagnostic metric including a choroidal vessel volume and a choroidal stroma volume.

The pathological condition may be autoimmune disease, and in that case the processor is further configured to evaluate a progress or risk of the autoimmune disease in the subject based on the diagnostic metric including a choroidal vessel volume and a choroidal stroma volume.

The pathological condition may be an endocrine disease, and in that case the processor is further configured to evaluate a progress or risk of the endocrine disease in the subject based on the diagnostic metric including a choroidal vessel volume and a choroidal stroma volume.

The pathological condition may be an autonomic dysfunction, and in that case the processor is further configured to evaluate a progress or risk of the autonomic dysfunction in the subject based on the diagnostic metric including a choroidal vessel volume and a choroidal stroma volume.

The receiver circuit may receive the three-dimensional volumetric data of the subject's eye from one scan of the subject's eye performed using an optical coherence tomography (OCT) scanner.

The processor may be further configured to perform a registration identifying a correspondence between a first value of the at least one diagnostic metric at a first location in the subject's eye and a second value of the at least one diagnostic metric at a second location in the subject's eye, where the registration is performed using the three-dimensional volumetric data co-localized with the enhanced three-dimensional volumetric data, and to evaluate the pathological condition based on the registration.

The processor may be further configured to perform a registration identifying a correspondence between a first value of the at least one diagnostic metric for a location in the subject's eye determined at a first time, and a second value of the at least one diagnostic metric for the location in the subject's eye determined at a second time later than the first time, where the registration is performed using the three-dimensional volumetric data co-localized with the enhanced three-dimensional volumetric data, and to evaluate the pathological condition based on the registration.

Another aspect of some embodiments is a method of medical diagnosis that includes obtaining three-dimensional volumetric data of a subject's eye; separating portions of the three-dimensional volumetric data into separate segments; performing processing differently on each of the separate segments; combining the separately processed segments to produce an enhanced three-dimensional volumetric data set; generating at least one diagnostic metric from the enhanced three-dimensional volumetric data set; and evaluating a pathological condition based on the at least one diagnostic metric.

Another aspect of some embodiments is a non-tangible, computer readable medium storing instructions, which when executed by a computer, performs steps that include obtaining three-dimensional volumetric data of a subject's eye; separating portions of the three-dimensional volumetric data into separate segments; performing processing differently on each of the separate segments; combining the separately processed segments to produce an enhanced three-dimensional volumetric data set; generating at least one diagnostic metric from the enhanced three-dimensional volumetric data set; and evaluating a pathological condition based on the at least one diagnostic metric.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The scope of the present disclosure is best understood from the following detailed description of exemplary embodiments when read in conjunction with the accompanying drawings, wherein:

FIG. 1 illustrates a flow chart of an example method according to an embodiment of the invention.

FIG. 2A illustrates an example application of pre-processing and segmentation according to an embodiment of the invention.

FIG. 2B illustrates a further example application of pre-processing, segmentations, and visualization & quantification/evaluation according to an embodiment of the invention.

FIG. 3A illustrates an example composite image generated according to an embodiment of the invention.

FIG. 3B illustrates another example composite image generated according to an embodiment of the invention.

FIG. 3C illustrates another example composite image generated according to an embodiment of the invention.

FIG. 3D illustrates another example composite image generated according to an embodiment of the invention.

FIG. 4A illustrates an example visualization of a diagnostic metric according to an embodiment of the invention.

FIG. 4B illustrates another example visualization of a diagnostic metric according to an embodiment of the invention.

FIG. 5 illustrates another example visualization of a diagnostic metric according to an embodiment of the invention.

FIG. 6 illustrates another example visualization of a diagnostic metric according to an embodiment of the invention.

FIG. 7 illustrates another example visualization of a diagnostic metric according to an embodiment of the invention.

FIG. 8 illustrates another example visualization of a diagnostic metric according to an embodiment of the invention.

FIG. 9 illustrates another example visualization of a diagnostic metric according to an embodiment of the invention.

FIG. 10 illustrates another example visualization of a diagnostic metric according to an embodiment of the invention.

FIG. 11 illustrates another example visualization of a diagnostic metric according to an embodiment of the invention.

FIG. 12 illustrates another example visualization of a diagnostic metric according to an embodiment of the invention.

FIG. 13 illustrates another example visualization of a diagnostic metric according to an embodiment of the invention.

FIG. 14 illustrates another example visualization of a diagnostic metric according to an embodiment of the invention.

FIG. 15 illustrates another example visualization of a diagnostic metric according to an embodiment of the invention.

FIG. 16 illustrates another example visualization of a diagnostic metric according to an embodiment of the invention.

FIG. 17 illustrates parameters of a blood vessel measurable according to an embodiment of the invention.

FIG. 18 is a diagram of features of a subject's eye according to the present disclosure.

FIG. 19 is a 3D-rendering of enhanced volumetric data according to an embodiment of the invention.

FIG. 20A is a 3D-rendering of enhanced volumetric data according to an embodiment of the invention.

FIG. 20B is a 3D-rendering of enhanced volumetric data according to an embodiment of the invention.

FIG. 20C is a 3D-rendering of enhanced volumetric data according to an embodiment of the invention.

FIG. 20D is a 3D-rendering of enhanced volumetric data according to an embodiment of the invention.

FIG. 20E is a 3D-rendering of enhanced volumetric data according to an embodiment of the invention.

FIG. 20F is a 3D-rendering of enhanced volumetric data according to an embodiment of the invention.

FIG. 20G is a 3D-rendering of enhanced volumetric data according to an embodiment of the invention.

FIG. 20H is a 3D-rendering of enhanced volumetric data according to an embodiment of the invention.

FIG. 20I is a 3D-rendering of enhanced volumetric data according to an embodiment of the invention.

FIG. 20J is a 3D-rendering of enhanced volumetric data according to an embodiment of the invention.

FIG. 20K is a 3D-rendering of enhanced volumetric data according to an embodiment of the invention.

FIG. 20L is a 3D-rendering of enhanced volumetric data according to an embodiment of the invention.

FIG. 21A is a view of a user interface according to an embodiment of the invention.

FIG. 21B is a B-scan image according to an embodiment of the invention.

FIG. 21C is a B-scan image according to an embodiment of the invention.

FIG. 22 is an en face image from an OCT scan prior to processing according to an embodiment of the invention.

FIG. 23 is an en face image after processing according to an embodiment of the invention.

FIG. 24 is a cross section diagram of a portion of a subject's eye illustrating features measurable by an embodiment of the invention.

FIG. 25 is a cross section diagram of a portion of a subject's eye illustrating features measurable by an embodiment of the invention.

FIG. 26 is a cross section diagram of a portion of a subject's eye illustrating features measurable by an embodiment of the invention.

FIG. 27A is a cross section diagram of a portion of a subject's eye illustrating features measurable by an embodiment of the invention.

FIG. 27B is a cross section diagram of a portion of a subject's eye illustrating features measurable by an embodiment of the invention.

FIG. 27C is a cross section diagram of a portion of a subject's eye illustrating features measurable by an embodiment of the invention.

FIG. 28A is a diagram showing eye features measurable by an embodiment of the invention.

FIG. 28B is a diagram showing eye features measurable by an embodiment of the invention.

FIG. 29A shows an example of a 3D visualization of a vessel structure from one side according to an embodiment of the invention.

FIG. 29B shows a skeletonized view of the vessel structure in FIG. 29A according to an embodiment of the invention.

FIG. 30 shows structures and landmarks of a subject's eye that are measurable according to an embodiment of the invention.

FIG. 31 shows exemplary computer hardware and software used to implement embodiments of the invention. Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DESCRIPTION OF EMBODIMENTS

The present disclosure relates to clinically valuable analyses and visualizations of three-dimensional (3D) volumetric OCT data that was not previously practical and/or possible with known technologies. Such analyses and visualizations may improve a medical practitioner's ability to diagnose disease, monitor, and manage treatment (i.e., evaluate progress or risk of a pathological condition). Briefly, the analysis is performed on, and the visualizations are created by, segmenting OCT data for a component of interest (e.g., choroidal vasculature) in three dimensions following a series of pre-processing techniques. The segmentation can be applied to the data following preprocessing, and then combined to produce a final full 3D segmentation of the desired component. Post-processing, such as a smoothing technique, may be then applied to the segmented component. While choroidal vasculature of OCT data is particularly discussed herein, the disclosure is not to be so limited.

The eye is the most important sensory organ and the window to observe the general health of the body. With the recent advancements in high speed and noninvasive eye imaging incorporated with optical coherence tomography (OCT), more health-related information can be revealed through the imaging of eye. The choroid is highly vascular, where the structural changes reflect various physiological and pathological conditions of the eye and the body. An embodiment of the present invention improves the ability to consider the 3D choroidal vasculature of pathological conditions and uses deep-learning-based, automatic 3D choroidal vascular visualization and volume measurement of OCT images.

The embodiments enable high sensitivity and specificity in diagnosing choroidal vessel related diseases using the choroidal vessel volume and whole choroidal volume acquired with the present method. Central Serous Chorioretinitis (CSC) and VogtKoyanagi-Harada (VKH) disease are discussed first, however, other diseases/conditions are also considered. CSC, which is a non-inflammatory disease that causes visual impairment, is commonly seen in prime-working-age population and may significantly disturb the patients' daily and social life. VKH, which is an inflammatory, progressive, and sight-threatening disease, is one of the major causes for blindness around the world. The embodiments of the invention identify biomarkers to be used in disease tracking and diagnosis and as the indicator of therapeutic effects in diseases that include glaucoma, age-related macular degeneration (AMD), and myopia.

The eye takes in 90% of the sensory needed to live. Suffering from eye diseases reduces the quality of life, and patients with visual impairment face increased risks of developing other pathologies and disabilities such as dementia or depression, particularly among the elderly population. Conversely, when abnormality in the general health occurs, changes may be found in the eye, especially in the posterior segment, i.e., the retina, choroid, and optic disc. For example, hypertension, diabetes, autoimmune diseases, opportunistic infections, and the like can be diagnosed from retinal findings. For example, Alzheimer's disease and the like may be diagnosed from fundus findings. Thus, examination of the eye provides biomarkers useful for assessments of some general diseases.

Choroidal tissue is believed to play an essential role in various physiological and pathological conditions of the eye, including the sight-threatening eye diseases such as AMD. The study of choroid, particularly its vascular structure and volume is of fundamental importance. Despite the clinical importance, examinations of choroidal tissues have been difficult using conventional methods. For example, the examination of choroid with slit lamp microscope is hindered by the retinal layers and by the anatomical character of the choroidal tissue itself. Currently, indocyanine green angiography (ICGA) and OCT are the standard techniques for evaluating the inner structures of choroid. ICGA, which is an invasive procedure with possibly severe adverse consequences, relies on the injection of dye to visualize the blood flow throughout a time series of 2D images. The lack of 3D information and distraction from the retinal vessels and leakage inherent with ICGA are the additional drawbacks. Obstructions and artifacts caused by the retinal layers above the choroid remain as barriers in clinical assessments based on conventional OCT imaging.

An embodiment of the invention may visualize and quantify the choroidal vessel structures using novel image processing that extracts the 3D information from the OCT image volumes. In this method, a series of pre-processing techniques are employed to address the issues that adversely influence the OCT image quality and thus the quantification. These include the speckle and random noises, shadow artifacts, and the signal attenuation and reduced image contrast in deep layers. Notably, the present preprocessing method works on a single OCT volume (e.g., a volume captured from a single OCT scan) that is routinely acquired without specific acquisition protocols, offering a practical advantage that it can be applied retrospectively to the existing database to get new insights of the disease conditions.

The choroid region and choroidal vessel structure are then segmented sequentially from the pre-processed OCT volume. The choroid region is defined to be the region between the Bruch's membrane (BM) 2416 (FIG. 24) and the Choroid Sclera interface (CSI) 1808 (FIG. 18) and is segmented by an embodiment of the invention using a deep-learning-based algorithm, while the choroidal vessels are segmented from a composite method that utilizes the contrast difference between the choroidal vessels and stroma.

An example method for producing clinically valuable analyses and visualizations according to the present disclosure is illustrated in FIG. 1. As seen therein, 3D volumetric OCT data is acquired and corresponding raw images (hereinafter the terms "images" and "data" are used interchangeably as the images are the representations of underlying data in a graphical form) are generated by imaging 100 a subject's eye. Following imaging, individual 2D images (or many 2D images collectively as a 3D volume) are pre-processed 102. The pre-processing 102 may, for example, address speckle and other noise in the data and images by applying a deep-learning based noise reduction technique, such as that described in U.S. patent application Ser. No. 16/797,848, filed Feb. 21, 2020 and titled "Image Quality Improvement Methods for Optical Coherence Tomography," the entirety of which is herein incorporated by reference. Further, shadow and projection artifacts may be reduced by applying image-processing and/or deep-learning techniques, such as that described in U.S. patent application Ser. No. 16/574,453, filed Sep. 28, 2019 and titled "3D Shadow Reduction Signal Processing Method for Optical Coherence Tomography (OCT) Images," the entirety of which is herein incorporated by reference. Of course, other de-noising techniques may be applied.

Intensity attenuation along the depth dimension may be addressed by applying an intensity compensation and contrast enhancement techniques. The intensity attenuation compensation can also address issues caused by hyperreflective region (e.g., when there is RPE damage) or hyporeflective region (e.g., when there is floater, drusen, or retinal detachment). Such techniques may be locally applied, for example, as a local Laplacian filter at desired depths and regions of interest (in either 2D or 3D). In addition to, or alternatively, a contrast-limited adaptive histogram equalization (CLAHE) technique, may be applied to enhance contrast. Of course, other contrast enhancement techniques (applied locally or globally), and/or other pre-processing techniques may be applied.

The pre-processing 102 may be applied to entire images or volumes, or only selected regions of interest. As a result, for each raw image or volume input to the preprocessing 102, multiple pre-processed images may be produced. Put another way, individual B-scans or C-scans taken from raw volumetric OCT data may be subject to different pre-processing techniques to produce multiple pre-processed images. Following pre-processing 102, the pre-processed images (or data underlying the images) are segmented 104 for a desired component in the images/data, such as choroidal vasculature. The segmentation process 104 may utilize one or more different techniques, where each applied segmentation technique may individually be relatively simple and fast to perform and have different strengths and weaknesses.

For example, some segmentation techniques may utilize different thresholding levels, and/or may be based on analysis from different views (e.g., a B-scan or C-scan). More particularly, performing segmentation on C-scans can improve continuity of vessels relative to segmentation performed on B-scans because each C-scan image contains information in the entire field of view of volume. This further allows for segmentation of smaller vessels relative to segmentation on B-scans and makes manual validation of the segmentation easier for a user. However, segmentation on C-scans may be dependent on the accuracy of a preceding Bruch's membrane segmentation used to flatten the volumetric data.

In view of the above, the different segmentation techniques can be selectively applied to one or more of the pre-processed images. Further, as suggested above, global segmentation on an entire OCT volume has not previously been practically possible due to noise and attenuation (e.g., causing artifacts). However, following application of the above-described pre-processing, the segmentation techniques may also be applied to entire OCT volumes according to an embodiment of the invention, rather than individual B-scans or C-scans from the volumes. In any case, each of the segmentation techniques segments the desired component in the pre-processed images/data. Segmentation applied to entire volumes can further improve connectivity of the segmentation, since individual segmentations need not be pieced together, although such segmentations may be less sensitive to local areas of the volume with relatively low contrast, but this can be mitigated by depth compensation and contrast enhancement techniques described above.

In one example embodiment, each segmentation technique may be applied to images/data having been separately pre-processed. In another embodiment, segmentation techniques may be selectively applied to images/data corresponding to different regions of interest. For example, a first two pre-processed images may be segmented according to a first segmentation technique, while a second two pre-processed images may be segmented according to a second segmentation technique. In another embodiment, after 3D volumetric OCT data has been pre-processed according to any number of techniques, a local thresholding segmentation technique is applied on B-scan images taken from the pre-processed 3D volumetric OCT data to generate a first determination of choroidal vasculature, a local thresholding technique is applied on C-scan images taken from the pre-processed 3D volumetric OCT data to generate a second determination of choroidal vasculature, and a global thresholding technique is applied to the entirety of the pre-processed 3D volumetric data to generate a third determination of choroidal vasculature.

Regardless of the number of pre-processing and segmentation techniques applied, the segmentations are then combined to produce a composite/enhanced segmented image or data, which is free from artifacts and of sufficient quality for both processing to determine different quantitative metrics as part of an analysis 108, and visualization of the segmentation and/or the metrics 110 (e.g., diagnostic metrics). The composite image may thus include all of the pre-processing and segmentation techniques and may be combined according to any method such as union, intersection, weighting, voting, and the like. Following segmentation 104, the segmented image or data may also be further post-processed, for example, for smoothing.

The above combination of pre-processing and segmentation is illustrated schematically with respect to FIG. 2A. The example therein utilizes two sub-sets of raw images and data, each from a common 3D volumetric OCT data set. The subsets of images/data may be separated according to region of interest, by view (e.g., B-scans and C-scans), and the like. According to the example of FIG. 2A, the first subset 200 is subject to a first pre-processing 202, while the second subset 204 is subject to a second pre-processing 206. In other embodiments (indicated by the dashed lines), each subset 200, 204 may be subject to any of the available pre-processings 202, 206. The data associated with the first subset 200 thus results in at least one pre-processed data subset, while the data associated with the second subset 204 thus results in at least two pre-processed data subsets. Following pre-processing, each resulting data set is then similarly segmented by any available segmentation technique (three shown for example). As illustrated, the results of each pre-processing are segmented separately by different segmentation techniques 208, 210, 212; however, in other embodiments (indicated by the dashed lines), one or more of the segmentation techniques 208, 210, 212 may be applied to any of the pre-processed images/data. Finally, the outputs of each segmentation technique 208, 210, 212 are combined 214 as discussed above to produce a composite enhanced segmentation. In view of the above, common raw images and data may be subject to different pre-processing and/or segmentation techniques as part of the method for producing a single composite segmentation of the 3D volumetric OCT data from which the raw images and data originated.

FIG. 2B shows a block diagram of another embodiment. In the example of FIG. 2B, a single OCT volume scan 216 is used for generating the 3D segmentation and corresponding quantitative diagnostic metrics. The pre-processing 218 step includes shadow reduction 224, noise reduction 226, attenuation compensation 228, and contrast adjustment 230 as previously described. The vessel segmentation 220 step includes a semi-automatic choroidal layer segmentation 232 (for diseased cases) where layers are segmented and corrected and a fully automatic composite segmentation 234 combining the segmentation results from B-scan view, C-scan view, and a global threshold. Both visualization and quantification 222 can be achieved from the segmentation. The 3D pixel-wise label of choroidal vessel can be directly used for rendering the 3D vessel structure for visualization 236 and a number of 2D and 3D quantifications (e.g., vessel volume map, vessel diameter map, etc.) can be generated 238.

An embodiment of the invention includes a Deep Learning (DL) based choroid segmentation method to segment choroid in disease conditions of interest. The DL method is trained to handle thick choroid and choroid that contains dilated vessels. Within the choroid region, choroidal vessels are segmented automatically according to an embodiment of the inventive segmentation algorithm that combines the results from local thresholding on B-scan view, local thresholding on C-scan view, and global thresholding methods. B-scan view segmentation may be applied to choroidal vessel segmentation for simplicity, but it often does not work well with small vessels. C-scan view images are generated by flattening the volume with respect to the Bruch's membrane (BM), and the segmentation in C-scan view improves the vessel connectivity, especially after shadow reduction technique. Additionally, since vessels at the same C-scan level have similar sizes, the segmentation works equally well for large and small vessels. On the other hand, the global thresholding method works best to segment large, dilated vessels in disease conditions when local thresholding methods struggle to perform in diseased cases. A composite segmentation result contains the detailed 3D choroidal vessel structure. Meanwhile, 3D stroma information is obtained through the inverse of the vessel segmentation.

3D segmentation according to an embodiment of the invention is performed on a pixel-basis, offering a practical advantage allowing for both 3D visualization and quantification of the choroidal vessels. The 3D segmentation is directly fed into a rendering engine to automatically create a 3D visualization of the choroidal vasculature. Clarity and details presented by an embodiment including the automatic segmentation method outperforms the reported methods. The detailed 3D visualization of the choroidal vascular morphology enables the depth-dependent observations that are not achievable with the existing technical methods.

As noted above, utilizing the plurality of pre-processing and segmentation techniques to produce a composite result, rather than performing a single complex pre-processing and segmentation reduces the total pre-processing and segmentation time and computational power. Nevertheless, the same quality may be achieved, and the segmentation can be applied to entire 3D volumes. The resulting segmentation can thus be free from noise and shadow artifacts and be of sufficient quality for visualization and quantification useful for evaluation and monitoring of pathological conditions as discussed in greater detail below.

FIGS. 3A-3D show example composite images rendering choroidal vasculature segmented out of 3D volumetric OCT data according to an embodiment of the invention. Although the examples in FIGS. 3A-3D are shown with differently hash patterned regions, the different regions may alternatively be displayed using colors to represent the values of the quantitative metrics at the corresponding region.

Referring back to FIG. 1, the composite image or volume may be processed to generate and analyze many quantifiable metrics 108 based on the entire volumetric OCT data, rather than two-dimensional data of B-scans previously used to for quantitative analysis of the volume. Because these diagnostic metrics (also referred to interchangeably as metrics, herein) are generated from the above-described pre-processed and segmented OCT data, the metrics are significantly more accurate than metrics derived from OCT data according to traditional techniques. Further, the metrics (and the segmented visualizations such as in FIG. 3A and any visualizations generated from the metrics) may be determined with respect to relatively large areas (e.g., greater than 1.5 mm of a single B-scan) over multiple 2D images of a volume or even whole volumes, and from a single OCT volume (as captured from a single scan, rather than an average of multiple scans).

For example, within a 3D volume, the spatial volume (and relatedly, density being a proportion of the entire volume in a given region that is vasculature or like segmented component), diameter, length, volumetric ratio (also referred to as an index), and the like, of vasculature can be identified by comparing data segmented out in the composite segmented image relative to the un-segmented data. For example, counting the number of pixels segmented out may provide an indication of the amount of vasculature (e.g., volume or density) within a region of interest. By projecting those metrics along one dimension (e.g., taking a maximum, minimum, mean, sum, or the like) such as depth, then a volume map, diameter map, index map, and the like can be generated. Such a map can visually show the quantified value of the metric for each location on a structure of the subject's eye (e.g., on the retina). Further, it is possible to identify the total volume, representative index, or the like by aggregating those metrics in a single dimension or a region of interest (e.g., over the entire map). Quantifying such metrics over large areas and from a single OCT volume permits previously unavailable comparison of volumetric OCT data between subjects, or of an individual subject over time.

The metrics may also be comparative. For example, a comparative metric may be based on metrics of OCT volumes obtained from a single subject at different times, from different eyes (e.g., right and left eyes of a single individual), from multiple subjects (e.g., between an individual and collective individuals representative of a population), or from different regions of interest of the same eye (e.g., different layers). These comparisons may be made by determining the metric for each element of the comparison and then performing any statistical comparison technique. For example, the comparative metric may be a ratio of the comparative data, a difference between the comparative data, an average of the comparative data, a sum of the comparative data, the deviation of the comparative data, and/or the like. The comparisons may be made generally for a total volumetric data or on a location-by-location basis (e.g., at each pixel location of a comparative map).

When comparing metrics from common regions of interest, the compared elements (different data sets, images, volumes, metrics, and the like) are preferably registered to each other so that like comparisons can be made. In other words, the registration permits corresponding portions of each element to be compared. In some instances, for example when comparing changes in choroidal vasculature, the registration may not be made based on the vasculature itself because the vasculature is not necessarily the same in each element (e.g., due to treatments over the time periods being compared). Put more generally, registration is preferably not performed based on information that may be different between the elements or that is used in the metrics being compared. In view of this, in some embodiments, registration may be performed based on en face images generated from raw (e.g., not pre-processed) OCT volumes of each compared element. These en face images may be generated be summation, averaging, or the like of intensities along each A-line in the region being used for registration. En face images are helpful in registration because retinal vessels can cast shadows, thus on OCT en face images, the darker retinal vasculature that stays relatively stable can serve as a landmark. Further, metrics, choroidal vasculature images, or like images generated from an OCT volume are co-registered with the en face image because they come from the same volume. For example, superficial vessels in a first volume may be registered to superficial vessels in a second volume, and choroidal vessels (or metrics of the choroidal vessels) in the first volume may be compared to choroidal vessels in the second volume.

Visualizations of these metrics may then be produced and displayed 110 or stored for later viewing. That is, embodiments of the invention are capable of producing not only visualizations of the segmented components of volumetric OCT data (e.g., choroidal vasculature) but also visualizations (e.g., maps and graphs) of quantified metrics related to that segmented component. Visualization of these quantified metrics further simplifies the above-noted comparisons. Such visualizations may be 2D representations of the metrics representing 3D volumetric information, and/or representations of the comparative metrics representing changes and/or differences between two or more OCT volumes. Considering the above-mentioned metrics, the visualizations may be, for example, a choroidal vessel index map, a choroidal thickness map, or a vessel volume map, and/or comparisons of each.

Information may be encoded in the visualizations in various forms. For example, an intensity of each pixel of the visualization may indicate a value of the metric at the location corresponding to the pixel, while color may indicate a trend of the value (or utilize intensity for the trend and color for the value). Alternatively, as shown in the examples of FIGS. 3A-3C, the different values may be indicated by differently hash patterned regions. Still other embodiments may use different color channels to identify different metric information (e.g., a different color for each metric, with intensity representing a trend or value for that metric). Still other embodiments may utilize various forms of hue, saturation, and value (HSV) and/or hue, saturation, and light (HSL) encoding. Still other embodiments may utilize transparency to encode additional information.

The visualization of FIG. 3A is a 2D image of choroidal vasculature, where the hash pattern of each pixel corresponds to a local trend of a metric as compared with a previous scan. For example, the hash pattern of each pixel may correspond to change in a vessel volume, vessel length, vessel thickness, or like measurement of the 3D volumetric data as compared with a previous metric measurement from a previously captured 3D volumetric data. For example, the figure can show the ratio (or difference) of a metric between the current examination and the previous examination. A red color, or a first hash pattern, may be used to indicate regions with expansion of the measurement (ratio >1 or difference >0) while a purple color, or a second hash pattern, may indicate regions with shrinkage of the measurement (ratio <1 or difference <0), and a green color, or a third hash pattern, may indicate regions with stable measurements (ratio ~1 or difference ~0). The different patterns help easily visualize local longitudinal changes. The comparison to previous measurements may be taken as a simple difference, a change relative to an average of a plurality of measurements, a standard deviation, and/or like statistical calculation. Of course, the correlation between colors and the change may be set according to other schemes.

Choroidal vessel 2D volume maps represent another example visualization according to the present disclosure. The choroidal vasculature volume of a 3D volumetric data set may be determined as the number of pixels corresponding to choroidal vasculature for each A-line of a 3D volumetric data multiplied by the resolution of each pixel. Where the aggregation occurs over depth, each pixel of the volume map corresponds to one A-line of the 3D volumetric data set. According to such a visualization, the intensity of each pixel in the volume map corresponds to the vessel volume at the corresponding location. Similarly, comparing the number of segmented pixels to the total number of pixels in the choroid (or other region) can provide a quantification of the vasculature (or other component) density over the region. Generally, volume and density may increase or decrease together. An embodiment of the invention can directly display the map with any colormap (each intensity corresponds to a color) to show the vasculature and quantitative vessel volume in one volume. In other cases, the embodiment can display the map as a composite image where the intensity of each pixel represents the quantity (e.g., vessel volume) while the color corresponds to a local trend in that volume as compared to a previous scan or another reference scan.

As suggested above, metrics used to generate the 2D visualization maps may be further aggregated over regions of interest for additional analysis. For example, the metric values and/or pixel intensities may be aggregated for regions corresponding to the fovea (having a 1 mm radius), parafovea (superior, nasal, inferior, tempo) (having a 1-3 mm radius from the fovea center), perifovea (superior, nasal, inferior, tempo) (having a 3-5 mm radius from the fovea center), and/or the like. The aggregation may be determined by any statistical calculation, such as a summation, standard deviation, and the like. If the aggregated numbers are collected at different points in time, a trend analysis can be performed and a corresponding trend visualization generated. The aggregated numbers can also be compared between patients or to a normative value(s).

An example visualization of a choroidal volume trend for the fovea and perifovea nasal is illustrated in FIG. 4A. As can be seen therein, choroidal volume was aggregated in each of the fovea and the perifovea nasal regions each week for a period of four weeks. The visualization makes it clear to see that the subject had an increase in vasculature volume in the perifovea nasal between weeks one and two, and a corresponding decrease in volume in the fovea over the same time. However, as vasculature volume in the fovea began to increase in week three, the volume in the perifovea nasal decreased below its original value. The volume in each region increased between weeks three and four.

Another example visualization is illustrated in FIG. 4B. Therein, the total volume of the choroidal vasculature is shown for different sectors of the choroid: fovea (center), nasal-superior (NS), nasal (N), nasal-inferior (NI), temp-inferior (TI), tempo (T), and tempo-superior (TS). The total volumes may be determined by summing the total number of choroidal vasculature pixels within each sector. Based on a resolution of the 3D data, the total number of pixels may then be converted to a physical size (such as cubic millimeters). According to the visualization of FIG. 4B, the volumes are shown prior to a treatment of the patient, one month following treatment, and one year following treatment. As can be seen, the volume of the vasculature greatly decreases in each sector following treatment.

Other 2D map and trend visualizations may be generated for different metrics. For example, a vessel thickness map and trend visualization may be generated by determining a total number of choroidal vasculature pixels for each A-line of a 3D volumetric data set; or a non-vessel index map and trend visualization may be generated by determining a total number of non-vessel pixels within a region (such as the choroid).

The above-described aspects are implemented via a hardware processor configured to execute software. A "processor" may be any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may be able to execute software instructions stored in some form of memory, either volatile or non-volatile, such as random access memories, flash memories, digital hard disks, and the like. The processor may be integrated with that of an OCT or like imaging system but may also stand alone or be part of a computer used for operations other than processing image data.

Clinical studies were performed to confirm the inventive embodiments. CSC and VKH patients were examined with a swept source optical coherent topography (SS-OCT): DRI-OCT (Registered Trademark) (TOPCON, Tokyo, Japan). 12 mm×9 mm B-scans over the macular area forms the 3D volume. Studies included 38 patients with healthy eyes (super normal subjects collected at the health check center, confirmed by ophthalmologists), 23 patients with treatment naive CSC, and 16 patients with VKH or sympathetic ophthalmitis (SO). The 23 CSC patients were randomly chosen by a retinal specialist from those diagnosed with diagnosis criteria of CSC in our medical record (78 patients). The 16 patients diagnosed with VKH or SO were recruited continuously by a clinic in the Osaka University Hospital. Twenty-three patients (5 females, 18 males) were diagnosed with CSC, based on the neurosensory detachment imaged by OCT, and the findings of fluorescein (leakage at the level of the retinal pigment epithelium (RPE)) and Indocyanine green Angiography (ICGA) (hyperpermeability of choroidal vessels). The patient records were reviewed retrospectively by a retinal specialist. We have excluded the subjects accompanied with other eye disease than CSC, as well as those with high pigment epithelium detachment that caused significant OCT signal attenuation prior to reaching choroid.

The VKH and SO study involved 32 eyes of 16 patients (5 females, 11 males) who were diagnosed with VKH or SO based on the clinical data from slit lamp examination, OCT, angiography, and lumbar puncture. Patient records were reviewed retrospectively by a uveitis specialist. The initial phase is defined as 3 days after treatment of the patient, as the severe retinal detachment and vitreous opacity due to inflammation generally obstruct the observation of choroid with SS-OCT at the first consultation.

3D OCT analysis and visualization according to embodiments of the invention includes inputting the 3D data acquired from a routine single OCT volumetric scan to generate the 3D vascular structure within the choroid for quantitative analysis, as shown in FIG. 2B.

A series of pre-processing methods are applied to the original volumetric OCT scan to enhance the image quality and aid the accurate choroidal vessel segmentation. Namely, a deep-learning-based (DL) noise reduction method reduces the speckle noise in OCT images to the level comparable to the 128× registration-average, a shadow reduction method that minimizes the shadow casted by retinal vessels in the choroid region, a depth attenuation compensation method that further improves the image contrast in deep choroid, and a local contrast enhancement that improves the vessel visualization.

Visualization comparisons according to the embodiments between normal subject eyes and CSC subject eyes indicates that at the retinal side, the blood vessel thicknesses of both subjects appear to be about similar. But at the sclera side, the CSC subject shows an increased vessel thickness and a distortion in the vessel shape. This visualization method may be applied retrospectively to the existing data of other eye diseases/pathological conditions as discussed below to help clinicians gain more insights regarding the disease conditions.

Vessel volume map, OCT B-scan, and 3D choroidal vascular structure visualization of a normal subject can be used for comparison with left and right eye visualizations of VKH subjects, according to an embodiment of the invention. The vessel volume maps of all the subjects may indicate quantitative values where the color bars have the same scale in units of volume (e.g., $mm^3$). Advantageously, according to the embodiments, the 3D choroidal vascular structure can be observed from the retinal side and from the scleral side or along any cross-section as well.

Visualizations according to the embodiments for the CSC subject show an increased vessel thickens and distortion in the vessel shape as compared to the healthy subject. Clear vessel structures are revealed in both cases despite the existence of high subretinal fluid (SRF) and a thick choroid in the diseased condition. The dark areas in ICGA indicate SRF and the malformed choroidal vessels behind. Since the malformed choroidal vessels are usually dilated and leaky, their structures and anatomical changes are difficult to observe in ICGA but more clearly observed in the vessel volume maps according to the embodiments. In areas where the choroidal vessel is clearly shown in ICGA, the vessel structures in vessel volume map match well with the ICGA images.

With the present method, a choroidal vessel volume map can be generated from the 3D vessel segmentation by calculating the total vessel volume along the depth direction. This newly generated vessel volume map exhibits the spatially colocalized structure and quantitative volume information at each location on the en face, and it may be utilized by clinicians to assess more of the disease conditions. For example, vessel volume maps may be shown for both healthy and diseased eyes, accompanied by the noise-reduced and shadow-compensated OCT B-scans across the fovea. The vessel volume map may clearly reveal the vessel structures not only in the normal case but also in the pathological case, despite the existence of high subretinal fluid (SRF) and a very thick choroid in the diseased condition. The intensity value of the vessel volume maps may correspond to the total vessel volume at each location, and the color bars in the unit of $mm^3$ in both subjects are depicted using a same scale. This color/intensity display enable an inspection of the larger vessel volume and the more dilated vessels of the CSC subject eye as compared to a healthy subject. The thickness difference is also confirmed in the OCT B-scans.

Traditionally, ICGA is performed as the gold standard to observe the lesions when ophthalmologist suspects a choroidal disease. With its high clarity in revealing choroidal vessels in both healthy and diseased cases, the vessel volume map method according to the present invention may provide a non-invasive alternative to ICGA in examining the choroidal diseases. For example, dark areas may be observed in ICGA, which indicate the presence of SRF and the malformed choroidal vessels behind. Since the malformed choroidal vessels are usually dilated and leaky, their structures and anatomical changes are difficult to observe in ICGA.

In contrast, visualization according to the present invention reveals the 3D vessel structure and may continue to work even in the condition that the vessels are leaky. Results indicate the vessel volume map reveals choroidal vessels more clearly than ICGA. In the areas where choroidal vessels are clearly imaged by ICGA, the vessel structure shown in the OCT vessel volume map matches well to that of the ICGA, including for the high-volume malformed ones. In other areas (around the macula), the choroidal vessel is more clearly observed in the vessel volume map according to an embodiment of the invention than in ICGA, where the ICGA image appears dark. Results indicate that in most of the cases when the choroid is observable by ICGA, vessel volume map presents a comparable, or even clearer, vessel structure compared to that by ICGA.

Thus, visualizations according to the present invention may allow for clear observation of vessel structure, even in disease conditions (better or comparable to ICGA). These visualizations also can highlight the vessel structure/volume distribution through appropriate colormaps for easy observation. Also, direct visualization of malforming or dilated vessels and locations becomes possible according to these visualizations. When plotted longitudinally, direct visual change in the vessel volume becomes apparent, for example, providing for monitoring of changes during a treatment.

During the clinical course, clinicians may find the vessel volume approach in embodiments of the invention to be useful in assessing the effect of treatment. For example, in a trial of a VKH subject, scans were taken at zero month (0M) (FIG. 3A), one month (1M) (FIG. 3B), and three months (3M) (FIG. 3C) after the treatment show improvement of the condition. For the display of vessel volume map, different colormaps can be employed to highlight different features of the map, e.g., the warm colormap generally highlight the vasculature while the cool colormap may be more suited for the inspection of volume change.

In the example of FIGS. 3A-3C, different hash patterns correspond to different vessel volumes in the range of $1 \times 10^4$ to $3 \times 10^4$ mm$^3$. Dramatic vessel volume change is observed with the VKH subject during treatment in FIGS. 3A-3C, while a merely slight change is observed with a comparative CSC subject (not shown). These observations of volume changes are in line with the choroidal thickness measured from the B-scans. The statistical comparisons of vessel volume at each time point are performed in the 3-mm-diameter circle in the ETDRS grid 302, for example as shown in FIG. 3D. Results from a CSC group (23 subjects) shows no significant change in choroidal volume or vessel volume during the treatment (FIGS. 5 and 6), as can be visually inspected in the vessel volume maps. In contrast, the VKH clinical subject group (10 subjects) exhibits significant changes of both choroid and vessel volumes after the treatment as indicated by the diagnostic metrics in FIGS. 7 and 8.

Disease diagnosis may also be performed using quantitative information derived from the imagery. FIGS. 9-16 show examples of aggregating quantitative map features within a region of interest and using the resulting values for disease diagnosis with area under curve (AUC) analysis (here particularly Receiver Operating Characteristic (ROC) curve). Thus, the quantitative values may be used as new biomarkers for disease diagnosis and new biomarker for treatment outcome monitoring. FIGS. 9-16 show examples of quantitative analysis of choroidal vessel volume and choroid volume used for disease diagnosis. Statistical comparisons for vessel volume and choroid volume may be quantified within regions of a 3-mm-diameter circle in the ETDRS grid. FIGS. 9/10 vs FIGS. 11/12 represent normal versus CSC, and FIGS. 13/14 vs. FIGS. 15/16 represent normal versus VKH. Vessel volume (p<0.0001) and choroidal volume (p<0.0001) are significantly different from the normal to both CSC and VKH. The area under the curve (AUC) of vessel volume and choroidal volume are 0.85 and 0.84 for CSC.

Metrics may be further calculated from the 3D volumetric data and imagery as follows. Volumes are represented as number of pixels*pixel resolution. Choroidal region is defined as the region between BM (Baruch's membrane)+40 μm and CSI (choroidal-sclera interface). Choroidal volume is the volume of the choroidal region. Vessel volume is the volume of the segmented choroidal vessel within the choroidal region. Parenchyma volume=choroidal volume-vessel volume. (Volumetric) vessel index=vessel volume/choroidal volume*100%. As shown in the example of FIG. 17, vessel diameter 1705=2*distance from center of each vessel (or vessel skeleton) 1707 to vessel boundary 1701, or other well-known methods of calculating vessel diameter. Vessel center 1707 may be found from a skeletonized vessel structure as shown in FIG. 29B. Vessel length 1703=length of the skeletonized vessel structure. Vessel density=volume/area of skeletonized vessel structure/choroidal volume/area*100% (volume for 3D situation, area for 2D situation). The "end" (i.e., measurement start point) can be a natural end where the vessel thins out and becomes not detectable by the method or where there is a break in the vessel, or the end may be at a bifurcation point where a vessel originates.

FIG. 3D shows an example of a ETDRS grid 302 overlay on a vessel volume map. The vessel volume map reveals quantitative vessel volume information at each location. Combined with the ETDRS grid 302, the vessel volume map can reveal local changes in each small region and assist clinicians to make better decisions. Vessel volume maps can be formatted to having smaller quadrants to reveal the local changes. Clinicians can then pinpoint the exact locations for assessments. The combination of visual observation and quantitative analysis by the present vessel volume method at the defined locations will be highly valuable for following the development/treatment of other disease conditions related to the eye.

On the quantification side, the values of choroid volume and vessel volume, and vessel index (the ratio between the vessel volume and the choroid volume) can be calculated for any of the regions of interests (e.g., ETDRS grid 302). Embodiments of the invention include statistical analyses of the choroidal metric changes. An example of the statistical approach has been tested on the CSC group (23 subjects) and the VKH group (10 subjects) and the results are shown in FIGS. 16 and 17 for the CSC group and in FIGS. 21 and 22 for the VKH group. A slight change in the vessel volume is observed along the CSC treatment (1.21±0.26 mm$^3$; 0 months, 1.13±0.28 mm$^3$; 1 month, 1.12±0.28 mm$^3$; 3 months), while a statistically significant change is observed along the VKH treatment (1.03±0.30 mm$^3$; 3 days, 0.77±0.30 mm$^3$; 1 month, 0.82±0.32 mm$^3$; 6 months).

Quantitative differences in vessel volume and choroid volume may be useful for diagnosis applications as shown by the comparison of the diseased group and the age matched normal group in order. The results between CSC and normal, and between VKH and normal are shown in FIGS. 9-16, as discussed above, with FIGS. 9-12 showing the CSC vs. normal comparison, and FIGS. 13-16 showing the VKH vs. normal comparison, with statistically meaningful differences found. The average vessel volume and choroidal volume of the normal group as measured within the middle circle (3 mm in diameter) of the ETDRS chart are 0.86 mm$^3$ and 1.76 mm$^3$, respectively. For comparison, both of these two choroidal metrics exhibit higher values among the diseased groups. Specifically, for the CSC group, the averages of vessel volume and choroidal volume are 1.27 mm$^3$ and 2.47 mm$^3$. Vessel volume (p<0.0001) and choroidal volume (p<0.0001) are significantly different from the normal. The area under the curve (AUC) of vessel volume and choroidal volume are 0.85 and 0.84 as measured from the ROC curve. For the use in diagnosis of CSC, the vessel volume is more than 0.95 mm$^3$, sensitivity 82.61%, specificity 70.13%, while the choroidal volume is larger than 2.07 mm$^3$, sensitivity 73.91%, specificity 70.13%. For the VKH group, the averages of vessel volume and choroidal volumes are 1.07 mm$^3$ and 2.25 mm$^3$, respectively. Vessel volume (p<0.001) and choroidal volume (p<0.001) are significantly different from the normal. For use in diagnosis of VKH, the vessel volume is larger than 0.93 mm$^3$, sensitivity 74.07%, specificity 63.64%, while the choroidal volume is more than 2.02 mm$^3$, sensitivity 70.37%, specificity 68.83%. Embodiments of the invention provide 3D volume quantitative results of choroid metrics in both healthy and typical choroidal vessel related diseases such as CSC and VKH.

For the two typical pathological conditions of CSC and VKH, embodiments of the invention show that the vessel volume map enables an inspection of the vessel structure comparable to, or even clearer than by ICGA. The newly acquired 3D structural and quantitative information of the choroidal vessels and stroma by the present method will benefit clinicians to get an insight of their pathological or anatomical changes, which have not been made possible by existing modalities. For example, embodiments of the invention have revealed an initial observation of the different behavior of change in the choroidal vessel volume between VKH and CSC subjects at different stages of clinical treatment. While CSC patients have the larger choroid and choroidal vessel volumes than healthy subjects, there are also healthy eyes having larger than normal choroid and choroidal vessel volumes than the normal, and some may carry the potential risk of developing CSC, which may then be monitored or evaluated by an embodiment of the invention. The choroidal vessel volume may also function as a biomarker for CSC in prevention medicine.

With its 3D visualization and quantification versality, the choroidal vessel volume is valuable for other choroidal vessel related diseases and to monitor the general health of the eye. It can also be applied retrospectively to the existing database to gain new insights of the disease and healthy conditions of the eye. The superior visualization and quantification achieved through a non-invasive and fast imaging modality can be applied to a variety of choroidal diseases related to blindness such as AMD and pathological myopia. For example, vessel volume may be useful in assessing the efficacy of anti VEGF treatment in AMD.

As shown in FIGS. 3A-3C, the 2D vessel volume maps may provide a comparison visualization at various points in time before and after treatment. A composite map may be generated to compare two or more quantitative vessel volume maps. Intensity may indicate the vessel structure (in one of the maps) while color, hash pattern, or grayscale value may indicate relative changes between maps. Such a visualization may advantageously pinpoint local changes around each vessel location, to help with disease monitoring. When a second map is a reference map, the composite map will highlight the normal/abnormal regions to make analysis easier for clinicians.

A 2D figure, such as in FIGS. 3A-3C, can portray the quantitative metrics (e.g., vessel volume, vessel diameter, vessel index, parenchyma (stroma) volume, choroidal volume) or meta-metrics (e.g., the relative change of a metric when comparing a follow-up scan registered to a baseline scan) mapped to the corresponding A-line location. The 2D quantitative metrics can be obtained by aggregating the metrics in 3D (e.g., maximum, minimum, average, etc.) or be obtained by slicing the 3D metrics with a 2D surface and showing the metrics at a certain depth (defined by the 2D surface). The shading/hashing (or in other cases can be represented by color or intensity) can directly represents the quantity for the metrics or meta-metrics (e.g., darker indicates higher value), therefore able to pin-point local metrics. In the case where the map is showing the relative changes (meta-metrics), it can be used to easily show global and local changes of a metric of interest (e.g., vessel volume) therefore be used to monitor the disease progression or treatment effect for subject longitudinally. In other cases, the intensity and color can encode two different metrics (e.g., intensity showing vessel volume while color showing the relative change compared to baseline) and form a composite map to show both the quantitative metric (absolute) and the relative change compared to baseline or last visit at the same time, allowing clinicians to make decisions with both information easily shown in one figure.

Other metric maps similar to the vessel volume maps may also be calculated from 3D vessel structure for visualization in the same way as the vessel volume map: vessel diameter map, vessel density map, vessel length map, and vessel index map, for example.

FIG. 18 represents layers of the posterior of the eye 1800 at locations around the optic disc 1812 including the retina 1802, the choroid 1810 and the sclera 1820. The boundaries between the layers are the Bruch's membrane (BM) 1822 and the choroidal-sclera interface (CSI) 1808. Also shown in FIG. 18 are the optic disc 1812, where optic nerves pass through both retina layer and choroid layer and connects to the brain, retinal veins 1814, retinal arteries 1816, choroidal vessels 1818, and penetrating vessels 1806 that penetrate through CSI 1808 from the sclera side, which can be visualized by embodiments of the invention, for example as shown in FIGS. 19 and 20 as discussed below. Penetrating vessels may correlate with myopia and glaucoma, based on metrics including length of the penetrating vessels, number of penetrating vessels, and symmetry of the penetrating vessels.

FIG. 19 shows a 3D-rendering 1900 viewed from the cross-section of the retina where a penetrating vessel 1902 is visible according to an embodiment of the invention. It would be difficult to manually identify all the penetrating vessels in a 2D B-scan, and it is not possible to accurately or directly measure the number of penetrating vessels, size and/or direction of each vessel. According to an embodiment of the invention, a curve 1904 is fit to a smoothed surface of the choroidal sclera interface (CSI) 1808, and by flattening the pre-processed OCT volume with respect to the curve 1904, which may be shifted up or down by a number of pixels determined by the user, the location, diameters at the CSI level, direction of penetration 1906 (absolute or relative to a reference vector), size of the penetration vessel, and number of penetrating vessels can be accurately quantified. Noise-reduction according to an embodiment of the invention has greatly improved the speckled appearance of the en face image and gives confidence to the identification. An en face image is a visualization of the 3D data that shows a volume or slide from a top view. Further, shadow compensation, according to an embodiment of the invention, minimizes shadow artifacts that can confound the identification of penetrating vessels on the en face. Penetrating vessels clearly appears as dark spots on the image and the locations (with respect to the ONH center or the fovea center, or the line between the two), diameters at the CSI level, and the number of penetrating vessels can be easily measured on the en face image. However, with a single 2D en face image, it is not possible to measure the length or direction of the penetrating vessels. FIG. 19 shows the side view of a 3D rendering of segmented choroidal vessels where we can observe penetrating vessels sticking out from the smooth choroidal sclera interface (CSI) and an embodiment of the invention can measure the length of the penetrating vessel (length of the vessel below the CSI boundary) or the direction of the vessel (e.g. direction with respect to the coordinates of the rendering, direction with respect to the normal direction of the local CSI boundary, direction with respect to the reference direction pointing from disc center to fovea center or vice versa, or other reference directions).

3D vessel segmentation makes visualizations and quantization of penetrating vessels possible, including the counting the number of vessels that penetrate and quantifying a symmetry of the penetrating vessels. The morphology (i.e., direction and thickness at different depths) of the penetrating vessels (i.e., vessels that penetrate through the smooth CSI boundary) may be correlated with conditions such as glaucoma or pathological myopia. The number of penetrating vessels can be easily identified from the en face view of the OCT or 3D vessel structure according to the embodiment. The number can be counted within a region of interest defined in the scan area. Vessel size can be measured just below the CSI boundary, or at any other depth. Vessel direction may be defined as the absolute penetrating direction in 3D space, or the relative direction compared to the reference line connecting disc center and fovea center. Number, size and direction of penetrating vessels can be measured for each quadrant of an eye, between two eyes of the same person, at a same time or over an elapsed period of time, and the symmetry can be measured (i.e., the similarity between different quadrants (nasal, temporal, inferior, superior) over the two eyes of a subject.

FIGS. 20A-L show frames captured from a video 3D visualization that can rotate in a horizontal direction (FIGS. 20A-F) and/or a vertical direction (FIGS. 20G-L) to easily render choroidal vessel structure, the choroidal-sclera interface (FIG. 19) and clearly represent the penetrating vessels.

Periodic anti-VEGF (Anti-Vascular Endothelial Growth Factor) injections may be used to treat neovascular age-related macular degeneration (wet-AMD), which may reduce choroidal volume. Relative changes of vessel volume and stroma volume may not be directly probed by conventional methods prior to the present invention. By separately monitoring the vessel volume, choroidal volume, and vessel index throughout the clinical course, and comparing between the responders and nonresponders (i.e., which structural elements respond or do not respond to the treatment), biomarkers are developed for prognosis of anti-VEGF (Anti-Vascular Endothelial Growth Factor) treatment for AMD. Moreover, observation of the choroidal vessel or stromal volume is performed according to the embodiments, to thereby determine which anti-VEGF treatment is the most effective (i.e., to check the drug screening).

Visualization according to the embodiments also determines which anti-VEGF treatment is the best for treatment in each patient (i.e., order made therapy), to check the choroidal vessel volume or stromal volume. Visualization according to the embodiments is also useful to determine the timing for switching medication (i.e., a time when some anti-VEGF treatment no longer works well and should be changed to a different drug). Similar analysis according to the embodiments is performed for other treatments related to pachychoroid (e.g., photocoagulation (PC), photodynamic therapy (PDT)).

FIG. 21A shows an example of a computer user interface 2100 providing the ability to easily visualize and quantify penetrating vessels and other metrics according to embodiments of the invention. In this example, a B-scan 2102 may be displayed adjacent to a corresponding en face rendering 2104, the location of the B-scan in the en face is indicated by the vertical line 2112. The B-scan 2102 indicates a location of the CSI boundary 2106, and the en face rendering 2104 shows the en face at the depth corresponding to boundary 2106 and penetrating vessels 2117, optic disc 2108, optic cup 2110, as well as B-scan location vertical line 2112. As shown in FIG. 21A the number of penetrating vessels 2117 and the size of the vessels at the CSI levels can be easily measured on the en face image at CSI level (or shift up/down by some pixels determined by user) with the enhanced OCT volume. The optic cup to disc ratio can also be measured and used according to the embodiments to assess optic disc cupping. However, in 2D image it is not possible to measure the length of the penetrating vessel, the diameter of the penetrating level at other depths, or the direction of the penetrating vessel. These can be measured in the 3D rendering of the vessel segmentation according to the embodiments. Vessel diameter and length can be measured the same as other vessels in 3D. The direction of the penetration may be correlated to disease diagnosis as well. In particular, the direction can be defined in the coordinates where the 3D rendering is generated, or relative to a reference direction, which can be the normal/tangential direction of the local CSI surface, or can be the direction pointing from the disc center to the fovea center.

FIGS. 21B and 21C show a typical B-scan after the pre-processing steps described in the current disclosure. The line 2106 in each figure indicates the CSI boundary. FIG. 21B is an example of the original B-scan and FIG. 21C shows the B-scan after flattening is performed with respect to the CSI according to an embodiment of the invention. Since penetrating vessels are vessels that go through the CSI boundary, flattening of the OCT volume with respect to the CSI boundary by the embodiment of the invention can identify the penetrating vessels using the en face image at the CSI level. Also shown for reference are retinal layers 2116, choroidal layer 2118, and sclera 2120.

FIG. 22 shows an example of an en face image of the original OCT scan of FIG. 21B at the CSI level. Due to the speckled appearance 2202 of the conventional OCT scan and the shadow artifacts from the superficial layers, it may not be easy to identify the penetrating vessels in the conventional scan.

FIG. 23 shows an example of the en face image of the enhanced and flattened OCT scan at CSI level as shown in FIG. 21C. As speckle noise and the shadow artifact have been minimized by the embodiment of the invention, it is easier to identify and quantify the penetrating vessels in the enhanced en face image. Penetrating vessels 2117 appear as dark dots on otherwise uniform intensity background. The size (e.g., diameter) of the vessels, number of the vessels, location of the vessels (e.g., distance to a center of the optic disc 2108, relative location to the direction between optic disc center and the fovea center) can therefore be obtained by the embodiment of the invention. These metrics (particularly near the optic disc) can correlate to glaucoma or myopia.

FIG. 24 shows a cross section diagram representing choriocapillaris 2402, medium vessels 2404 (in Sattler's layer), large vessels 2406 (in Haller's layer), RPE 2408, Bruch's membrane 2416, sclera 2410, and retina 2412. Using denoise and deep learning of the 3D visualization according to an embodiment, metrics according to a tumor in choroid or glaucoma in choroid can be monitored. After treatment (e.g., anti VEGF treatment, laser treatment, PDT treatment, etc.), visualization can determine which layers have changed, leading to resolution of pathology and physiology that aids in evaluation of progress in the treatment. Conventional methods monitor treatment effects with the central choroidal thickness, which typically reduces after successful treatment. However, that conventional method provides only a one dimensional metric and cannot reflect the relative change/reaction of vessel and stroma to the treatment. For example, a reduction in choroidal thickness can be caused by vessel size reduction alone, or stroma size reduction alone, or a combination of the two with varying ratios, which can only be distinguished using the 3D separate volume analysis enabled by the present invention.

FIG. 25 shows a cross section having a granuloma or tumor 2502. Under conventional methods, a choroidal granuloma or tumor 2502 may have a similar appearance to (an indistinguishable from) the large choroidal vessels 2406. With the localized quantitative vessel analysis according to the present invention, it becomes possible to separately monitor the size change of tumor 2502 as well as the vessel/stroma volume changes surrounding the tumor 2502.

FIG. 26 shows a diagram showing illustration of choroidal neovascularization (CNV) in the late stage of AMD. Type I CNV 2604 located beneath the RPE 2408 and type II CNV 2602 expand into the subretinal space between the neurosensory retina and the RPE. CNV is typically treated with anti-VEGF therapy. Embodiments of the current invention allow characterization of which structure (i.e., which of the large vessels 2406, medium vessels 2404, choriocapillaris 2402, or stroma, etc.) will change from the anti-VEGF treatment. There are different drugs for anti-VEGF therapy and some subjects are non-responders to certain drugs. The ability to detect non-responders early and be able to switch drugs is useful and the monitoring of volumes of the different structures according to embodiments of the invention can assist early detection. It may also be possible to distinguish different types of CNV, and select medication based on observation of which layer/structure changed or did not change from treatment. Separate analysis of vessel and stroma can also reveal how each part of the choroid changes in response to therapy.

FIGS. 27A-C show example visualizations indicating different choroidal thickening mechanisms for VKH and CSC, which allow distinguishing diseases that cannot be easily distinguished according to conventional methods. For example, FIG. 27A shows a normal cross section visualization of retina 2412, choroid 2702, blood vessels 2704, and choroidal stroma 2712. FIG. 27B represents an example of a cross section visualization of a patient with CSC, and FIG. 27C represents an example of a cross section visualization of a patient with VKH. As can be seen, the VKH patient in FIG. 27C has significantly thicker choroid (larger choroidal volume due to choroidal thickness 2714 being greater than normal choroidal thickness 2706) as compared with the normal case, while the vessel index (Ratio between vessel volume/area and total choroid volume/area) is slightly smaller than normal. Vessel volume/area is/are metrics that are quantifiable by the invention using measurements of vessel cross dimensions 2710 in longest and shortest directions. Vessel volume and vessel area may be the same metric depending on the region being considered. Vessel volume/area is calculated by number of pixels*pixel resolution. If the region is 3D, the pixel resolution will be 3D, indicating a volume. Conversely, if region is 2D (e.g., inside a B-scan), the pixel resolution is 2D, indicating an area. Both vessel and parenchyma expand in VKH, but parenchyma expands a lot more. The CSC patient has larger choroidal volume due to larger choroidal thickness 2708 and larger vessel index than normal, and the vessel rather than the parenchyma expands in CSC. Thus, according to an embodiment of the invention, it is possible to distinguish VKH form CSC with the separate analysis of vessel and parenchyma. This is not possible with conventional methods that merely show both VKH and CSC producing increased choroidal thickness. According to the present method, the conditions can be distinguished by the vessel volume, which can be quantized according to the invention, and in particular, by a consideration of the vessel volume, choroid volume, and vessel index, which can be separately quantized according to the invention.

While monitoring the clinical course of VKH subject, an increase in vessel index/vessel volume may indicate disease recurrence. In routine monitoring of normal subjects, an increase in vessel volume/vessel size/vessel diameter or a change in morphology may indicate potential of developing CSC. By comparing vessel volume/vessel size/vessel diameter in subjects undergoing different treatments for CSC or MPPE (e.g., photocoagulation (PC) vs photodynamic therapy (PDT)) may be comparatively evaluated.

Choroid naturally thins as people age. With analysis and visualization according to the present method, an embodiment of the invention can establish the baseline for thinning in normal subjects as they age, for vessel volume, choroid volume, parenchyma volume, and vessel index, as well as number and size of penetrating vessels. The rate at which the choroid thins with age is highly variable. Comparing a subject's thinning rate with a reference normal rate according to a conventional method could be a diagnosis/prognosis of disease, but that conventional approach is unreliable and limited due to the large variation in "normal" rate.

According to an embodiment of the invention, since the vessel volume and stroma volume of the choroid may be measured/quantified separately, an embodiment of the invention may establish a natural thinning rate that is less variable and therefore serves as a better diagnosis/prognosis tool. Additional to normal thinning, glaucoma may cause further thinning of choroidal vessel and decrease number/size of penetrating vessels around the optic disc area, especially temporal side of optic discs. By comparing normal subjects against the baseline established according to an embodiment of the invention, prognosis can be achieved for potential glaucoma development.

High myopia is associated with choroid thinning. Therefore, separate analysis of vessel volume, choroid volume, parenchyma volume, and vessel index, as well as number and size of penetrating vessels according to embodiments of the invention, embodiments of the invention can separate the thinning rate for each component. By comparing the trend of changes between pathological myopia and other myopic subjects, embodiments of the invention may establish prognosis for pathological myopia. The number/size of penetrating vessel and choroidal vessel volume (stroma volume or vessel index) will affect the progression of pathological myopia. The progression of myopia is believed to be related to the size and number of penetrating vessels around the optic nerve, and therefore, the progression may be monitored/characterized by quantization of one or more of those metrics according to an embodiment of the invention.

Hypertension prognosis may also be related to metrics measurable according to the embodiments. Hypertension is believed to affect the choroidal vascular system. By analyzing the separate vessel volume, choroid volume, parenchyma volume, and vessel index for people developed hypertension comparing with normal control, embodiments of the invention may establish the character or biomarker for groups at risk for conditions that develop the complications. Also, by performing checks during regular blood pressure using vessel volume, choroid volume, parenchyma volume, and vessel index in each person can monitor disease progression. With that index as the normal state, each person confirms the fluctuation of blood pressure. Although each person will have a regular blood pressure, in the pathological condition, the blood pressure may change dynamically (i.e., more fluctuation of blood pressure may appear under the pathological condition). Thus, enhanced monitoring of the disease is possible according to an embodiment of the invention.

Preeclampsia prognosis may also be related to metrics possible according to the embodiments. For example, preeclampsia is believed to affect choroidal vascular system. By analyzing the separate vessel volume, choroid volume, parenchyma volume, and vessel index for people developed preeclampsia, and comparing with normal control, embodiments of the invention can establish prognosis for groups at risk for such conditions during pregnancy. Also, by checking those metrics during regular pregnancy the conditions for preeclampsia may be monitored.

Prognosis of visual acuity changes after retinal detachment may also related to metrics possible according to the embodiments. Retinal detachment, in which the sensory retina detaches from retinal pigment epithelium layer, is a one of the causes of blindness. In that case, the sensory retina is cut off from the supply of nutrients and oxygen from the retinal pigment epithelium. Visual acuity (VA) prognosis depends on how long the retina is detached. By comparing vessel volume, choroid volume, parenchyma volume, and vessel index, embodiments of the invention may establish prognosis for VA after treatment for retinal detachment patient. For potential poor VA prognosis patients, doctors may observe and evaluate disease and/or treatment progress from those indices.

Embodiments of the invention may elucidate pathophysiology of retinal pigmentosa. Retinal pigmentosa is one of the major causes of blindness, clinically we observe the typical retinal appearance or ophthalmic examination results, but the pathophysiology is not clear due to causes unknown. By analyzing the separate vessel volume, choroid volume, parenchyma volume, and vessel index for people developed retinal pigmentosa, the prognosis or timing of deterioration of retinal pigmentosa may be predicted.

Dialysis in kidney disease is believed to be correlated to metrics available according to embodiments of the invention. By analyzing the separate vessel volume, choroid volume, parenchyma volume, and vessel index for people developed kidney disfunction comparing with normal control, an embodiment of the invention can establish the character or biomarker for groups at risk for conditions that develop the complications. Also, by checking these metrics during regular kidney function with using vessel volume, choroid volume, parenchyma volume, and vessel index in each person, and using that index as the normal state, each person may individually confirm the fluctuation of kidney function. In addition, by observing these indexes before and after dialysis, it becomes possible to search for an appropriate dialysis method.

FIG. 29A shows an example of a 3D visualization of a vessel structure from one side (e.g., from front/retina side) of the vasculature. Alternatively, a 3D visualization according to an embodiment of the invention can alternatively be represented from another side (e.g., from a back side) of the vasculature. Observation of vessel structure can be made from both front and back sides to observe morphology changes during disease. Cross-sectional observation may be performed along different directions at regions of interest. 2D quantitative vessel visualization may be performed to provide clear visualization of healthy and malfunctioning vessels with a non-invasive method as compared to conventional Indocyanine Green Angiography (ICGA). Longitudinal trend analysis can be performed from quantifications made, for example from different directions front/back, in support of diagnosis and monitoring needs, and quantifications can be used as biomarkers for disease diagnosis. The healthy case shows uniform vessel sizes (from both retina side and sclera side) and regular vessel shape. The pathological case has dilated vessels and reduced density on sclera side, and the vessel shapes are more torturous and irregular. Regional reduced density or dilated vessels in healthy case may indicate early stage or possible development of diseases. Thus, the invention may provide visualization/quantification for prognosis. In the retina side vessel visualization of FIG. 29A, blood vessels 2902 may be depicted with red pixels or a first hash pattern, while empty space 2904 represents stroma regions. The disc cutout 2906 automatically omits the optic nerve region from quantization. Alternatively, in a retina side stoma structure visualization according to an embodiment of the invention, blue pixels or a second hash pattern may represent stoma regions while empty spaces represent blood vessels.

3D visualizations of the retina side in a healthy patient's eye, and 3D visualizations of the sclera side in the healthy patient's eye, can be used to quantify healthy and pathological features.

For example, as shown in the example of healthy eye in FIG. 28A and eye with pathological condition in FIG. 28B, an embodiment of the invention can determine the tortuosity/regularity of vessels by comparing a straight line length 2804 of a blood vessel with an actual blood vessel path length 2802. Dilation of the blood vessels may be quantified by an embodiment of the invention as discussed above with respect to FIG. 17. Visualization of the vessel structure from all directions (i.e., front/back or from any reference plane in 3D space) provides ability to discover/understand differences in different subjects and over time in the same subject.

All metrics may be calculated locally or averaged in a 3D region (e.g., over the whole field of view (FOV) of scan, or over subregions of the region according to a grid, like the Early Treatment Diabetic Retinopathy Study (ETDRS) grid show in FIG. 3D.

According to an embodiment of the invention, in the rendered OCT scan, each pixel has resolution (axial and transverse) determined by the system and can be readily obtained for volume/area calculation. Choroidal region is defined between BM (Bruch's membrane) 2416+40 μm and CSI (choroidal-sclera interface) segmentation lines. Choroidal volume is calculated by number of pixels corresponding to choroidal region*volumetric pixel resolution. Vessel volumes are calculated by # pixels corresponding to vessel*volumetric pixel resolution. The volume can be aggregated within any defined region of interest (e.g., while FOV, section in ETDRS grid 302). The volume can also be aggregated just along an A-line to obtain vessel volume map in en face direction as in FIGS. 3A-C. Parenchyma/Stroma volume=number of pixels corresponding to vessel*volumetric pixel resolution choroidal volume=vessel volume+stroma volume, so any one can also be derived from the other two. (Volumetric) vessel index=vessel volume/choroidal volume*100%.

FIG. 29A shows an example of a vessel volume map in greyscale. FIG. 29B shows an example of a skeletonized vessel volume map, with vessel skeletons 2908 generated from calculated center coordinates of each blood vessel in FIG. 29A. The skeleton map can also be generated in 3D data rather than 2D in FIG. 29A. The vessel length may be quantized as the number of pixels of a predefined intensity in the vessel skeleton map times the pixel resolution in one dimension. The vessel volume map in FIG. 29A may also be displayed with the skeleton image in FIG. 29B overlayed thereon.

FIG. 30 shows the basic structures and landmarks in an eye, indicating relative directions: temporal 3002 and nasal 3004. Optic nerve head 3006 and four large vessels 3008 that originate from the optic never head 3006. Also shown are the macular location 3010, reference line 3012 showing the direction from ONH center to the macular center (fovea), which can serve as a reference direction for other metrics (e.g., penetrating vessel direction). Clinically important region 3014 shows where penetrating vessels 3016 (having metrics such as size, number, penetrating direction, symmetry, etc., which are quantifiable according to the present invention) from sclera may correlate with glaucoma (or myopia). For example, the number/size of penetrating vessels and choroidal vessel volume (stroma volume or vessel index) as in FIG. 19 will affect the progression of glaucoma and therefore can be used as biomarkers or indicators of glaucoma according to an embodiment of the invention.

By visually inspecting the 3D structure of choroidal vasculature, doctors can get information regarding vessel size/diameter, vascular structure/vessel shape (straight, regular or torturous, irregular), vessel density (how densely vessels are packed), and distribution of vessel size (e.g., thinner towards retina, thicker towards sclera). Vessel size and its distribution can be quantitatively measured by the vessel diameter metric. Metrics such as vessel length, vessel density, vessel volume, and vessel index can quantitatively characterize vascular structure.

The choroid volume, choroidal vessel volume, and vessel index and other diagnostic metrics disclosed herein can also result in the following applications.

In CSC cases, the vessel volumes and the choroid volumes significantly increase in comparison to normal (healthy) cases. Normal cases with large vessel volumes may be prone to CSC. Embodiments of the invention may therefore predict prognosis based on vessel volume and choroid volume.

Understanding how and when vessel volume changes after anti-VEGF treatment can improve treatment, it may be helpful to measure the choroid volume and the vessel volume of the patient to evaluate if no effectiveness is achieved for a patient before other metrics (e.g., visual acuity changes). An embodiment of the invention uses the vessel volume (vessel index) for prognosis prediction in VKH cases. The increase in vessel index value or vessel volume is believed to be an indicator of a likelihood of VKH recurrence before the recurrence is otherwise detected.

The number, morphology, density (number per unit area), and size of perineural vessels penetrating the sclera are also used by embodiments of the invention, for example to predict glaucoma or high myopia, in which there may be more of these vessels, or these vessels may become thinner.

Embodiments of the invention can also predict glaucoma or pathologic myopia based on measurable changes in choroidal vessel volume, which may become smaller with aging.

Choroidal vessel volumes are believed to change in proportion to the degrees of myopia. Embodiments of the invention may evaluate whether they increase or decrease and therefore, may be used as an indicator of pathologic myopia.

Associations are believed to exist between the development of Peripapillary Atrophy (PPA) and the choroidal vessel volume and the choroid volume. Thus, embodiments of the invention may be used for the prediction of myopia based on those measurable metrics.

Vessels penetrating the sclera are believed to become thinner in myopia cases. Thus, the thinning, detectable according to an embodiment of the invention, is believed to be associated with the progression of myopia. Pathological myopia is an advanced stage of myopia where sight-threatening complications (e.g., macular degeneration, neovascularization, retinal detachment, etc.) will occur. It is therefore possible to monitor the progression of myopia and prevent the development of pathological myopia according to embodiments of the invention.

Both CSC and Multifocal Placoid Pigment Epitheliopathy (MPPE) cases may have retinal pigment epithelium that cause the dysfunction. The choroidal vessel volume or choroid volume becomes larger in clinical examination. But it is believed the choroidal vessel volume or choroid volume decrease by treatment (sclerotomy, PDT, PC). Thus, embodiments of the present invention can be used as the indices for the effectiveness of treatment.

Visual prognosis for diabetic retinopathy (because of the decrease in the choroidal vessel volume) is believed to be associated with metrics observable by embodiments of the present invention. Choroidal vessel volumes after treatment of diabetic retinopathy (laser, surgical treatment, anti-VEGF medicine administration) are believed to be associated with prognosis. Maintaining the choroidal vessel volume may be important to maintaining the health of the subject's eye. For example, a healthy choroidal vessel can keep the ordinary oxygen supplies to keep the retinal pigment epithelial cells healthy. The pathologic conditions of pit macular syndrome believed to be associated with metrics observable by embodiments of the present invention, because pit macular syndrome may have an abnormal flow from the subarachnoid space at the optic disc.

Choroidal vessel volumes and/or the choroid volumes are believed to be associated with the pathologic conditions of pigmentary degeneration of the retina, the pigmentary degeneration is conventionally detected from a fundus photograph of the retina, and there is no conventional OCT available to obtain such an image. An embodiment of the invention, however, provides a high quality rendering at retinal pigment layers to enable observation of slight changes. Therefore, that condition may be diagnosed according to an embodiment of the present invention.

Choroidal vessel volumes and/or the choroid volumes are believed to be associated with visual prognosis after retinal detachment surgery. For example, acute severe retinal detachment may reduce the volume of choroidal vessels due to surgical-induced inflammation, and therefore that condition may be diagnosed according to an embodiment of the present invention.

Blood pressure/high blood pressure and lipid/hyperlipidemia/autonomic nerves as the factors that affect the choroidal vasculature. However, the reports have only discussed the findings (observations) on the angiosclerosis of choroidal vessels and the choroidal thickness, while the vessel morphology and the vessel volume are still unclear. Nevertheless, it is believed that high blood pressure and lipid/hyperlipidemia may be diagnosed according to metrics available according to the present embodiments.

Choroidal volume (vessel or stroma) is believed to be associated with neural degenerative disease such as dementia (Alzheimer's disease), and therefore those conditions may be diagnosed according to an embodiment of the present invention.

Choroidal volume (vessel or stroma) is believed to be associated with circulation disease (hypertension et al), and therefore that condition may be diagnosed according to an embodiment of the present invention.

Choroidal volume (vessel or stroma) is believed to be associated with autoimmune disease. Therefore, that condition may be diagnosed according to an embodiment of the present invention.

Choroidal volume (vessel or stroma) is believed to be associated with endocrine disease such as diabetes et al. Therefore, that condition may be diagnosed according to an embodiment of the present invention.

Choroidal vessel volume (or stromal volume) is believed to be associated with autonomic dysfunction. Therefore, that condition may also be diagnosed according to an embodiment of the present invention.

Without the need for special protocols, the techniques used here does not need to be connected directly or simultaneously to an OCT scanner and can be applied retrospectively on any existing 3D data. The 3D data can be aggregated to a single value or be sliced/aggregated along any direction to obtain 2D view like previous technologies can, while also providing the ability of viewing the whole 3D information and switching between different views/locations without additional processing and can provide better accuracy than 2D. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Control methods and systems described herein may be implemented using computer programming or engineering techniques including computer software, firmware, hardware or any combination or subset thereof, wherein the technical effects may include at least processing of the three-dimensional volumetric data and diagnostic metrics according to the present disclosure.

FIG. 31 illustrates a block diagram of a computer that may implement the various embodiments described herein. Control aspects of the present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible and non-transitory device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD), MO, and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions implementing the functions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 31 is a functional block diagram illustrating a networked system 3100 of one or more networked computers and servers. In an embodiment, the hardware and software environment illustrated in FIG. 31 may provide an exemplary platform for implementation of the software and/or methods according to the present disclosure. Referring to FIG. 31, a networked system 3100 may include, but is not limited to, computer 3105, network 3110, remote computer 3115, web server 3120, cloud storage server 3125 and computer server 3130. In some embodiments, multiple instances of one or more of the functional blocks illustrated in FIG. 31 may be employed.

Additional detail of a computer 3105 is also shown in FIG. 31. The functional blocks illustrated within computer 3105 are provided only to establish exemplary functionality and are not intended to be exhaustive. And while details are not provided for remote computer 3115, web server 3120, cloud storage server 3125 and computer server 3130, these other computers and devices may include similar functionality to that shown for computer 3105. Computer 3105 may be a personal computer (PC), a desktop computer, laptop computer, tablet computer, netbook computer, a personal digital assistant (PDA), a smart phone, or any other programmable electronic device capable of communicating with other devices on network 3110.

Computer 3105 may include processor 3135, bus 3137, memory 3140, non-volatile storage 3145, network interface 3150, peripheral interface 3155 and display interface 3165. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 3135 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm. Bus 3137 may be a proprietary or industry standard high-speed parallel or serial peripheral interconnect bus, such as ISA, PCI, PCI Express (PCI-e), AGP, and the like.

Memory 3140 and non-volatile storage 3145 may be computer-readable storage media. Memory 3140 may include any suitable volatile storage devices such as Dynamic Random Access Memory (DRAM) and Static Random Access Memory (SRAM). Non-volatile storage 3145 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 3148 may be a collection of machine readable instructions and/or data that is stored in non-volatile storage 3145 and is used to create, manage and control certain software functions that are discussed in detail elsewhere in the present disclosure and illustrated in the drawings. In some embodiments, memory 3140 may be considerably faster than non-volatile storage 3145. In such embodiments, program 3148 may be transferred from non-volatile storage 3145 to memory 3140 prior to execution by processor 3135.

Computer 3105 may be capable of communicating and interacting with other computers via network 3110 through network interface 3150. Network 3110 may be, for example, a local area network (LAN), a wide area network (WAN) such as the Internet, or a combination of the two, and may include wired, wireless, or fiber optic connections. In general, network 3110 can be any combination of connections and protocols that support communications between two or more computers and related devices.

Peripheral interface 3155 may allow for input and output of data with other devices that may be connected locally with computer 3105. For example, peripheral interface 3155 may provide a connection to external devices 3160. External devices 3160 may include devices such as a keyboard, a mouse, a keypad, a touch screen, and/or other suitable input devices. External devices 3160 may also include portable computer-readable storage media such as, for example, thumb drives, portable optical or magnetic disks, and memory cards. Software and data used to practice embodiments of the present disclosure, for example, program 3148, may be stored on such portable computer-readable storage media. In such embodiments, software may be loaded onto non-volatile storage 3145 or, alternatively, directly into memory 3140 via peripheral interface 3155. Peripheral interface 3155 may use an industry standard connection, such as RS-232 or Universal Serial Bus (USB), to connect with external devices 3160.

Display interface 3165 may connect computer 3105 to display 3170. Display 3170 may be used, in some embodiments, to present a command line or graphical user interface to a user of computer 3105. Display interface 3165 may connect to display 3170 using one or more proprietary or industry standard connections, such as VGA, DVI, DisplayPort and HDMI.

As described above, network interface 3150, provides for communications with other computing and storage systems or devices external to computer 3105. Software programs and data discussed herein may be downloaded from, for example, remote computer 3115, web server 3120, cloud storage server 3125 and computer server 3130 to non-volatile storage 3145 through network interface 3150 and network 3110. Furthermore, the systems and methods described in this disclosure may be executed by one or more computers connected to computer 3105 through network interface 3150 and network 3110. For example, in some embodiments the systems and methods described in this disclosure may be executed by remote computer 3115, computer server 3130, or a combination of the interconnected computers on network 3110.

Data, datasets and/or databases employed in embodiments of the systems and methods described in this disclosure may be stored and/or downloaded from remote computer 3115, web server 3120, cloud storage server 3125 and computer server 3130.

Numerous modifications and variations of the present invention are possible in light of the above teachings. It is therefore to be understood that within the scope of the appended claims, the invention may be practiced otherwise than as specifically described herein.

The invention claimed is:

1. A medical diagnostic apparatus, comprising:
a receiver circuit that receives three-dimensional volumetric data of a subject's eye;
a processor configured to separate portions of the three-dimensional volumetric data into separate segments, perform processing differently on each of the separate segments, and combine the separately processed segments to produce an enhanced three-dimensional volumetric data set;
the processor is further configured to generate at least one diagnostic metric from the enhanced three-dimensional volumetric data set; and
the processor is further configured to evaluate a pathological condition based on the at least one diagnostic metric, wherein
the pathological condition is glaucoma, and
the processor is further configured to evaluate a progress or risk of the glaucoma in the subject based on the diagnostic metric including a number of perineural vessels that penetrate a sclera of the subject's eye, a morphology of the perineural vessels that penetrate the sclera, and a size of the perineural vessels that penetrate the sclera.

2. The medical diagnostic apparatus according to claim 1, wherein:
the processor is further configured to generate a visualization to render a three-dimensional view of the diagnostic metric superimposed on a structure of the subject's eye.

3. The medical diagnostic apparatus according to claim 1, wherein:
the at least one diagnostic metric includes at least one of a choroidal vessel diameter, a choroidal vessel shape, a choroidal vessel density, a choroidal vessel positional distribution, a choroidal vessel tortuosity, a choroidal vessel index, a choroidal vessel volume, a choroidal stroma volume, a penetrating vessel length, a penetrating vessel direction, a penetrating vessel symmetry, a penetrating vessel number, a penetrating vessel density, a perineural vessel size, and a tumor size.

4. The medical diagnostic apparatus according to claim 1, wherein:
the receiver circuit receives the three-dimensional volumetric data of the subject's eye from one scan of the subject's eye performed using an optical coherence tomography (OCT) scanner.

5. The medical diagnostic apparatus according to claim 1, wherein:
the processor is further configured to perform a registration identifying a correspondence between a first value of the at least one diagnostic metric at a first location in the subject's eye and a second value of the at least one diagnostic metric at a second location in the subject's eye, where the registration is performed using the three-dimensional volumetric data co-localized with the enhanced three-dimensional volumetric data, and
the processor is further configured to evaluate the pathological condition based on the registration.

6. The medical diagnostic apparatus according to claim 1, wherein:
the processor is further configured to perform a registration identifying a correspondence between a first value of the at least one diagnostic metric for a location in the subject's eye determined at a first time, and a second value of the at least one diagnostic metric for the location in the subject's eye determined at a second time later than the first time, where the registration is performed using the three-dimensional volumetric data co-localized with the enhanced three-dimensional volumetric data, and
the processor is further configured to evaluate the pathological condition based on the registration.

7. A method of medical diagnosis comprising:
obtaining three-dimensional volumetric data of a subject's eye;
separating portions of the three-dimensional volumetric data into separate segments;
performing processing differently on each of the separate segments;
combining the separately processed segments to produce an enhanced three-dimensional volumetric data set;
generating at least one diagnostic metric from the enhanced three-dimensional volumetric data set; and
evaluating a pathological condition based on the at least one diagnostic metric, wherein
the pathological condition is glaucoma, and
the method further comprises evaluating a progress or risk of the glaucoma in the subject based on the diagnostic metric including a number of perineural vessels that penetrate a sclera of the subject's eye, a morphology of the perineural vessels that penetrate the sclera, and a size of the perineural vessels that penetrate the sclera.

8. A non-transitory computer readable storage medium storing instructions, which when executed by a computer, performs steps comprising:
obtaining three-dimensional volumetric data of a subject's eye;
separating portions of the three-dimensional volumetric data into separate segments;
performing processing differently on each of the separate segments;
combining the separately processed segments to produce an enhanced three-dimensional volumetric data set;
generating at least one diagnostic metric from the enhanced three-dimensional volumetric data set; and
evaluating a pathological condition based on the at least one diagnostic metric, wherein
the pathological condition is glaucoma, and
the steps performed by the computer further comprise evaluating a progress or risk of the glaucoma in the subject based on the diagnostic metric including a number of perineural vessels that penetrate a sclera of the subject's eye, a morphology of the perineural vessels that penetrate the sclera, and a size of the perineural vessels that penetrate the sclera.

* * * * *